US008654171B2

(12) United States Patent
Minabe et al.

(10) Patent No.: US 8,654,171 B2
(45) **Date of Patent: *Feb. 18, 2014**

(54) EXPOSURE DEVICE AND IMAGE FORMING DEVICE

(75) Inventors: Jiro Minabe, Kanagawa (JP); Akira Tateishi, Kanagawa (JP); Katsunori Kawano, Kanagawa (JP); Shin Yasuda, Kanagawa (JP); Yasuhiro Ogasawara, Kanagawa (JP); Kazuhiro Hayashi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 322 days.

This patent is subject to a terminal disclaimer.

(21) Appl. No.: 12/644,865

(22) Filed: Dec. 22, 2009

(65) Prior Publication Data

US 2010/0259739 A1 Oct. 14, 2010

(30) Foreign Application Priority Data

Apr. 9, 2009 (JP) ................................ 2009-095325
Sep. 14, 2009 (JP) ................................ 2009-212419

(51) Int. Cl.
*B41J 15/14* (2006.01)
*B41J 27/00* (2006.01)
*G02B 5/32* (2006.01)
*G02B 26/10* (2006.01)

(52) U.S. Cl.
USPC ............... 347/256; 347/241; 359/15; 359/17; 359/19

(58) Field of Classification Search
USPC ......... 347/118, 119, 129, 130, 134, 137, 149, 347/230, 238, 241, 256, 258; 359/12, 15, 359/17, 19, 30, 31
See application file for complete search history.

(56) References Cited

U.S. PATENT DOCUMENTS 4,580,151 A * 4/1986 Bamba .......................... 347/135
6,643,300 B1 * 11/2003 Ori ................................. 372/23
7,187,399 B2 * 3/2007 Noguchi et al. .............. 347/241
7,885,164 B2 * 2/2011 Horimai ........................ 369/103

(Continued)

FOREIGN PATENT DOCUMENTS

CN A-1580864 2/2005
CN A-1871641 11/2006

(Continued)

OTHER PUBLICATIONS

Office Action dated Jun. 18, 2013 issued in Japanese Patent Application No. 2012-195290 (with translation).

(Continued)

*Primary Examiner* — Uyen Chau N Le
*Assistant Examiner* — John M Bedtelyon
(74) *Attorney, Agent, or Firm* — Oliff PLC

(57) ABSTRACT

There is provided an exposure device including: a light-emitting element array at which a plurality of light-emitting elements, that emit light that passes through an optical path of diffused light, are arrayed one-dimensionally or two-dimensionally on a substrate; and a hologram element array at which a plurality of hologram elements are formed at positions, that respectively correspond to the plurality of light-emitting elements, of a hologram recording layer disposed on the substrate, so as to diffract and collect, at an outer side of illumination regions of all of the plurality of light-emitting elements, respective lights that are emitted from the plurality of light-emitting elements respectively.

6 Claims, 23 Drawing Sheets

(56) References Cited

U.S. PATENT DOCUMENTS

| | | | | |
|---|---|---|---|---|
| 8,081,360 | B2 * | 12/2011 | Yasuda et al. | 359/15 |
| 8,466,949 | B2 | 6/2013 | Minabe et al. | |
| 2003/0215229 | A1 | 11/2003 | Moriya et al. | |
| 2005/0024477 | A1 | 2/2005 | Noguchi et al. | |

FOREIGN PATENT DOCUMENTS

| | | | | |
|---|---|---|---|---|
| JP | A-61-172114 | | 8/1986 | |
| JP | A-4-201270 | | 7/1992 | |
| JP | 2000330058 A | * | 11/2000 | B41J 2/44 |
| JP | A-2000-330058 | | 11/2000 | |
| JP | A-2001-171174 | | 6/2001 | |
| JP | 2007237576 A | * | 9/2007 | |
| JP | A-2007-237576 | | 9/2007 | |

OTHER PUBLICATIONS

Office Action dated Jun. 18, 2013 issued in Japanese Patent Application No. 2009-212419 (with translation).

Mar. 19, 2013 Notice of Allowance issued in U.S. Appl. No. 12/614,799.

Dec. 6, 2012 Office Action issued in U.S. Appl. No. 12/614,799.

Apr. 4, 2012 Office Action issued in U.S. Appl. No. 12/614,799.

Office Action dated Oct. 10, 2013 issued in Chinese Patent Application No. 200910265268.7 (with translation).

* cited by examiner

EXPOSURE DEVICE AND IMAGE FORMING DEVICE

CROSS-REFERENCE TO RELATED APPLICATION

This application is based on and claims priority under 35 USC 119 from Japanese Patent Applications No. 2009-095325 filed on Apr. 9, 2009 and No. 2009-212419 filed on Sep. 14, 2009.

BACKGROUND

1. Technical Field

The present invention relates to an exposure device and an image forming device.

2. Related Art

An exposure device of the laser ROS (Raster Output Scanner) method, that scans by a polygon mirror light that is emitted from a laser light source, is conventionally used as an exposure device that writes a latent image onto a photoreceptor drum in copiers, printers and the like that form images by the electrophotographic method. Recently, exposure devices of the LED method that utilize light-emitting diodes (LEDs) as the light source are mainly being used instead of exposure devices of the laser ROS method. An exposure device of the LED method is called an LED print head, and is abbreviated as LPH.

An LED print head has an LED array in which numerous LEDs are arrayed on an elongated substrate, and a lens array in which numerous refractive index distribution type rod lenses are arrayed. Note that, here, "array" means a row of elements in which elements such as plural LEDs or plural lenses or the like are arrayed in a one-dimensional form or a two-dimensional form. In an LED array, numerous LEDs are arrayed in correspondence with the number of pixels in the fast scanning direction, for example, 1200 pixels per inch (i.e., 1200 dpi) are arrayed. A cylindrical rod lens exemplified by a SELFOC™ is used as the refractive index distribution type rod lens.

At the LED print head, the lights emitted from the respective LEDs are collected by the rod lenses, and an erect equal magnification image is imaged on a photoreceptor drum. Accordingly, a scanning optical system of the laser ROS method is not needed, and the structure can be made much more compact than a structure in accordance with the laser ROS method. Further, a driving motor that rotates a polygon mirror also in unnecessary, and there is the advantage that mechanical noise does not arise.

Several techniques using a hologram element array instead of rod lenses in LED print heads have been proposed.

LED print heads using LED arrays are generally used as exposure devices of the electrophotographic method, and therefore, this type of exposure method is usually called the "LED method". However, because there is no need to limit the light-emitting elements to LEDs, hereinafter, the "LED method" will, for convenience, instead be called the "light-emitting element array method".

SUMMARY

According to an aspect of the invention, there is provided an exposure device including:

a light-emitting element array at which plural light-emitting elements, that emit light that passes through an optical path of diffused light, are arrayed one-dimensionally or two-dimensionally on a substrate; and a hologram element array at which plural hologram elements are formed at positions, that respectively correspond to the plural light-emitting elements, of a hologram recording layer disposed on the substrate, so as to diffract and collect, at an outer side of illumination regions of all of the plural light-emitting elements, respective lights that are emitted from the plural light-emitting elements respectively.

BRIEF DESCRIPTION OF THE DRAWINGS

Exemplary embodiments of the present invention will be described in detail based on the following figures, wherein.

DETAILED DESCRIPTION

Examples of exemplary embodiments of the present invention will be described in detail hereinafter with reference to the drawings.

First Exemplary Embodiment

Image Forming Device

Figure 1:
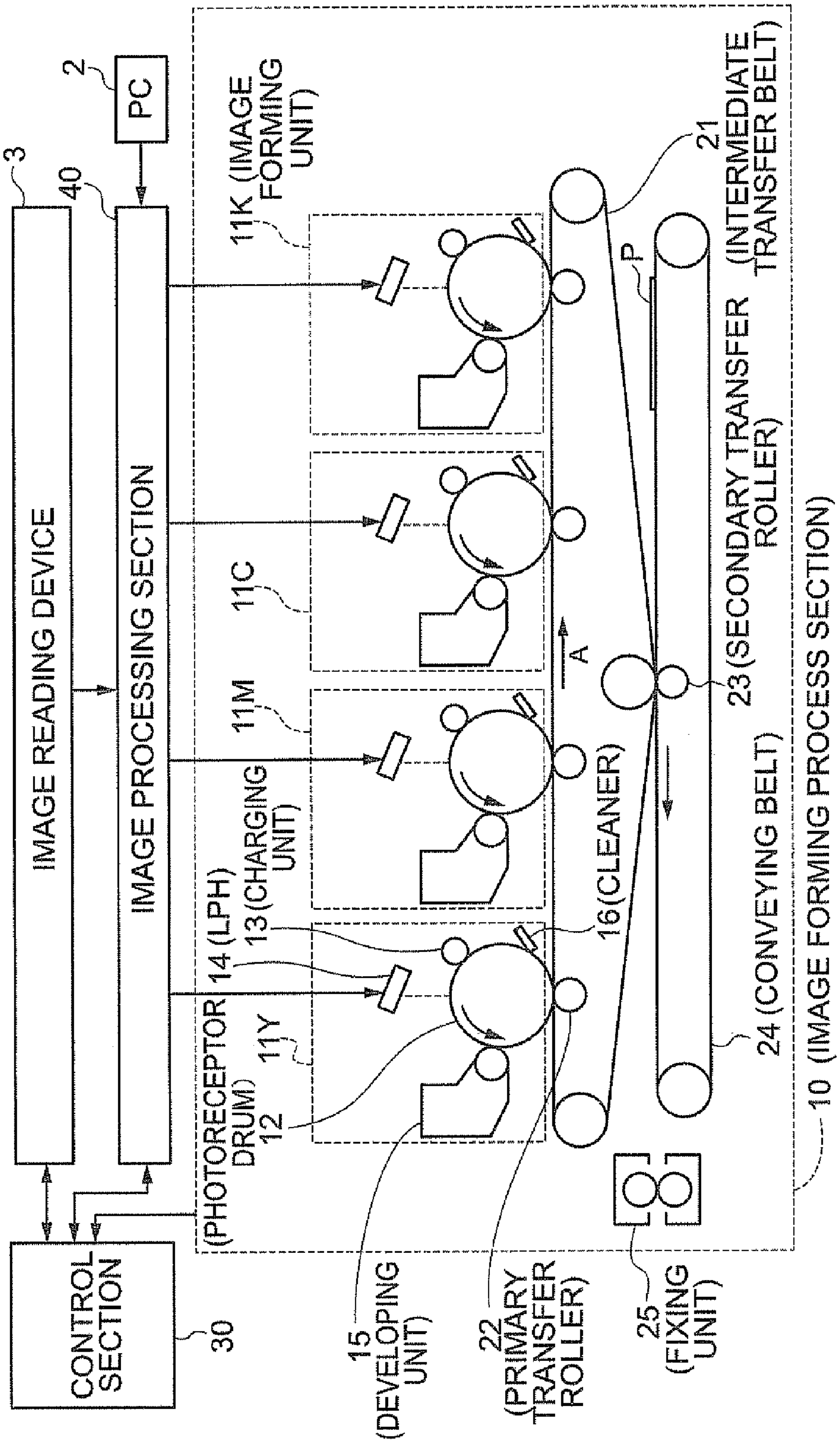
FIG. 1 is a schematic drawing showing an example of the structure of an image forming device relating to an exemplary embodiment of the present invention.

FIG. 1 is a schematic drawing showing an example of the structure of an image forming device relating to a first exemplary embodiment of the present invention. This image forming device is a so-called tandem type digital color printer, and has an image fowling process section 10 serving as an image forming section that carries out image formation in accordance with image data of respective colors, a control section 30 controlling the operations of the image forming device, and an image processing section 40 that is connected to an image reading device 3 and to an external device such as, for example, a personal computer (PC) 2 or the like, and that carries out predetermined image processings on image data received from these devices.

The image forming process section 10 has four image forming units 11Y, 11M, 11C, 11K that are disposed in parallel at uniform intervals. The image forming units 11Y, 11M, 11C, 11K form toner images of yellow (Y), magenta (M), cyan (C), black (K), respectively. Note that the image forming units 11Y, 11M, 11C, 11K are collectively called the "image forming units 11" as appropriate.

Each of the image forming units 11 has a photoreceptor drum 12 serving as an image carrier on which an electrostatic latent image is formed and that carries a toner image, a charging unit 13 that uniformly charges the surface of the photoreceptor drum 12 at a predetermined potential, an LED print head (LPH) 14 serving as an exposure device that exposes the photoreceptor drum 12 charged by the charging unit 13, a developing unit 15 that develops the electrostatic latent image obtained by the LPH 14, and a cleaner 16 that cleans the surface of the photoreceptor drum 12 after transfer.

The LPH 14 is an elongated print head of a length that is substantially the same as the axial direction length of the photoreceptor drum 12. Plural LEDs are arranged in the form of an array along the lengthwise direction at the LPH 14. The LPH 14 is disposed at the periphery of the photoreceptor drum 12 such that the lengthwise direction of the LPH 14 faces the axial direction of the photoreceptor drum 12. Further, in the present exemplary embodiment, the operation distance of the LPH 14 is long, and the LPH 14 is disposed so as to be separated by several cm from the surface of the photoreceptor drum 12. Therefore, the width that the LPH 14 occupies in the peripheral direction of the photoreceptor drum 12 is small, and crowding at the periphery of the photoreceptor drum 12 is mitigated.

The image forming process section 10 has an intermediate transfer belt 21 onto which toner images of the respective colors, that were formed at the photoreceptor drums 12 of the respective image forming units 11, are multiple-transferred, a primary transfer roller 22 that successively transfers (primarily transfers) the toner images of the respective colors of the respective image forming units 11 onto the intermediate transfer belt 21, a secondary transfer roller 23 that collectively transfers (secondarily transfers), onto a sheet P that is a recording medium, the superposed toner image transferred on the intermediate transfer belt 21, and a fixing unit 25 that fixes the secondarily-transferred image on the sheet P.

Next, operation of the above-described image forming device will be described.

First, the image forming process section 10 carries out image formation operation on the basis of control signals such as synchronizing signals and the like that are supplied from the control section 30. At this time, image data, that is inputted from the image reading device 3 or the PC 2, is subjected to image processings by the image processing section 40, and is supplied to the respective image forming units 11 via an interface.

For example, at the yellow image forming unit 11Y, the surface of the photoreceptor drum 12, that has been charged uniformly at a predetermined potential by the charging unit 13, is exposed by the LPH 14 that emits light on the basis of the image data obtained from the image processing section 40, and an electrostatic latent image is formed on the photoreceptor drum 12. Namely, due to the respective LEDs of the LPH 14 emitting light on the basis of the image data, the surface of the photoreceptor drum 12 is fast-scanned, and, due to the photoreceptor drum 12 rotating, the surface is sub-scanned, and the electrostatic latent image is formed on the photoreceptor drum 12. The formed electrostatic latent image is developed by the developing unit 15 such that a yellow toner image is formed on the photoreceptor drum 12. Similarly, toner images of the respective colors of magenta, cyan, black are formed at the image forming units 11M, 11C, 11K.

The toner images of the respective colors formed at the respective image forming units 11 are successively electrostatically attracted and transferred (primarily transferred) by the primary transfer roller 22 onto the intermediate transfer belt 21 that rotates in the arrow A direction in FIG. 1. A superposed toner image is formed on the intermediate transfer belt 21. Accompanying the movement of the intermediate transfer belt 21, the superposed toner image is conveyed to the region (secondary transfer portion) at which the secondary transfer roller 23 is disposed. When the superposed toner image is conveyed to the secondary transfer portion, the sheet P is supplied to the secondary transfer portion in accordance with the timing of the toner image being conveyed to the secondary transfer portion.

Then, due to a transfer electric field that is formed by the secondary transfer roller 23 at the secondary transfer portion, the superposed toner image is electrostatically transferred (secondarily transferred) all at once onto the sheet P that has been conveyed-in. The sheet P, on which the superposed toner image has been electrostatically transferred, is peeled-off from the intermediate transfer belt 21 and is conveyed to the fixing unit 25 by the conveying belt 24. The unfixed toner image on the sheet P that has been conveyed to the fixing unit 25 is subjected to fixing processing by heat and pressure by the fixing unit 25, and is thereby fixed on the sheet P. The sheet P on which the fixed image has been formed is then discharged-out to a sheet discharge tray (not shown) that is provided at a discharging section of the image forming device.

Note that, due to a longer length of the operation distance of the LPH, the periphery of the photoreceptor drum does not become crowded, and the image forming device can be made compact on the whole. In a conventional LPH, the optical path length (operation distance) from the lens array end surface of the rod lens to the imaging point is short at around several mm, and the proportion of the periphery of the photoreceptor drum that the exposure device occupies is large. Further, generally, in an LPH that uses LEDs that emit incoherent light, the coherence is low and spot blurring (so-called color aberration) arises, and it is not easy to form minute spots.

<LED Print Head (LPH)>

(Structure of LPH)

Figure 2:
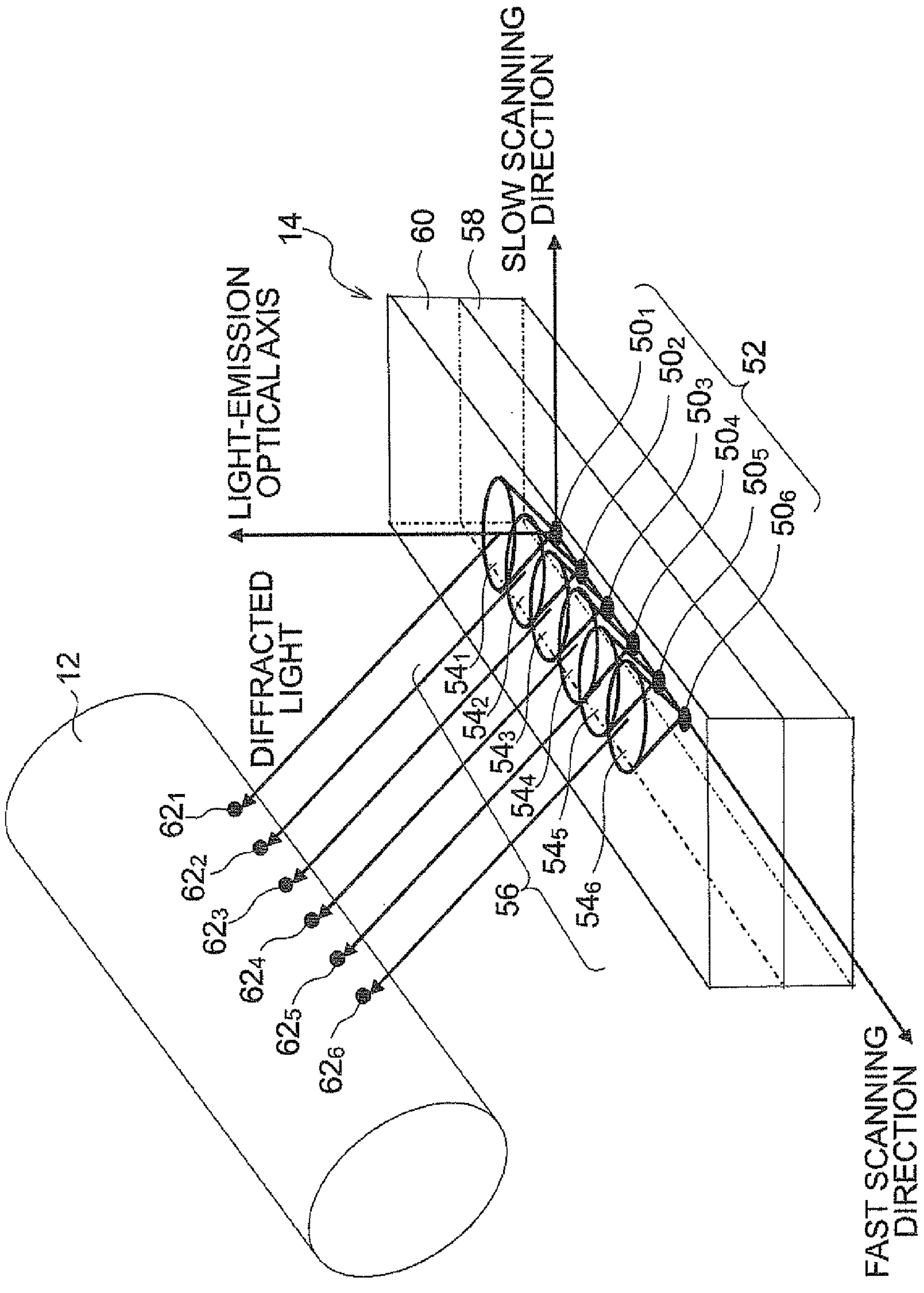
FIG. 2 is a schematic perspective view showing an example of the structure of an LED print head that serves as an exposure device relating to the exemplary embodiment of the present invention.
Figure 3A:
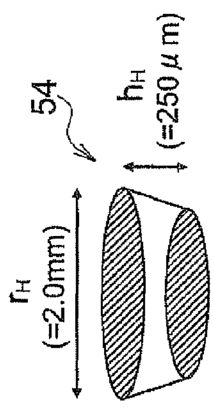
FIG. 3A is a perspective view showing the schematic shape of a hologram element.
Figure 3B:
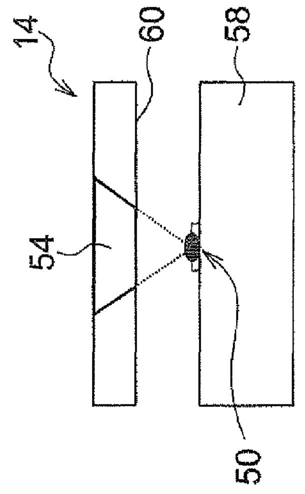
FIG. 3B is a cross-sectional view in a slow scanning direction of the LED print head.
Figure 3C:
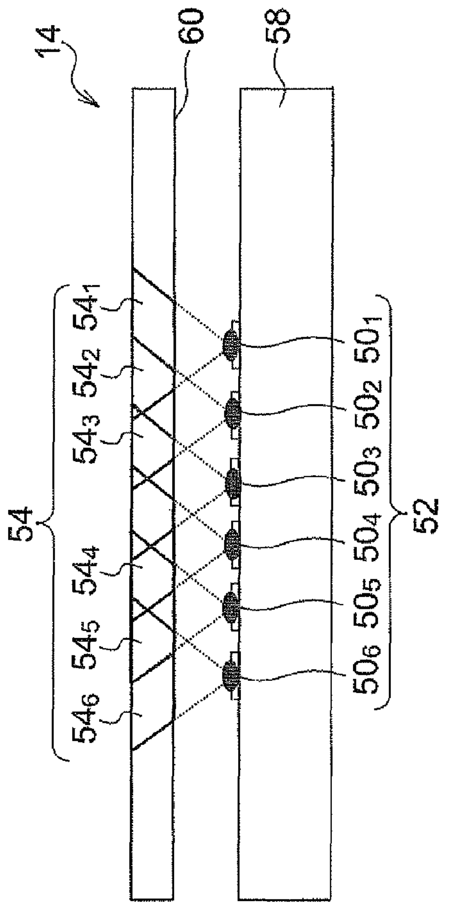
FIG. 3C is a cross-sectional view in a fast scanning direction of the LED print head.

FIG. 2 is a schematic perspective view showing an example of the structure of an LED print head that serves as an exposure device relating to the first exemplary embodiment. FIG. 3A is a perspective view showing the schematic shape of a hologram element, FIG. 3B is a cross-sectional view in the slow scanning direction of the LED print head, and FIG. 3C is a cross-sectional view in the fast scanning direction of the LED print head.

As shown in FIG. 2, the LED print head (LPH 14) has an LED array 52 equipped with plural LEDs 50, and a hologram element array 56 equipped with plural hologram elements 54 that are provided in respective correspondence with the plural LEDs 50. In the example shown in FIG. 2, the LED array 52 has six LEDs $\mathbf{50}_1$ through $\mathbf{50}_6$, and the hologram element array 56 has six hologram elements $\mathbf{54}_1$ through $\mathbf{54}_6$. Note that, when there is no need to differentiate between the respective LEDs or between the respective hologram elements, the LEDs $\mathbf{50}_1$ through $\mathbf{50}_6$ are collectively called the "LEDs 50", and the hologram elements $\mathbf{54}_1$ through $\mathbf{54}_6$ are collectively called the "hologram elements 54".

Each of the plural LEDs 50 is packaged on an elongated LED substrate 58 together with driving circuits (not shown) that drive the respective LEDs 50. As described above, the LEDs 50 are arrayed along a direction parallel to the axial direction of the photoreceptor drum 12. The arrayed direction of the LEDs 50 is the "fast scanning direction". Further, the respective LEDs 50 are arrayed such that the interval (light-emitting point pitch) in the fast scanning direction of two LEDS 50 (light-emitting points) that are adjacent to one another is a uniform interval. Note that slow scanning is carried out by rotation of the photoreceptor drum 12, and the direction orthogonal to the "fast scanning direction" is illustrated as the "slow scanning direction".

The hologram element array 56 is formed within a hologram recording layer 60 that is formed on the LED substrate 58. As will be described later, there is no need for the LED substrate 58 and the hologram recording layer 60 to fit tightly together. In the example shown in FIG. 3B and FIG. 3C, the hologram recording layer 60 is held by an unillustrated holding member at a position that is separated, by a predetermined height, from the LED substrate 58.

The hologram recording layer 60 is structured from a polymer material that can record and hold a hologram permanently. A so-called photopolymer can be used as this polymer material. A photopolymer records a hologram by utilizing the change in the refractive index due to polymerization of photopolymerizable monomers. In the same way as the LEDs 50, the respective hologram elements 54 are arrayed along the fast scanning direction in respective correspondence with the LEDs 50. Further, the respective hologram elements 54 are arrayed such that the interval in the fast scanning direction of two hologram elements 54 that are adjacent to one another is the same interval as the aforementioned light-emitting point pitch.

As shown in FIG. 3A and FIG. 3B, each of the hologram elements 54 is formed in the shape of a truncated cone whose hologram recording layer 60 obverse side is the floor surface and that converges toward the LED 50 side. A truncated cone shaped hologram element is described in this example, but the shape of the hologram element is not limited to the same. For example, the hologram element can be made into the shape of a cone, an oval cone, a truncated oval cone, or the like. The diameter of the truncated cone shaped hologram element 54 is greatest at the floor surface. The diameter of the floor surface of this circle is "hologram diameter $r_H$". Each of the hologram elements 54 has the hologram diameter $r_H$ that is greater than the light-emitting point pitch. For example, the light-emitting point pitch is 30 μm, the hologram diameter $r_H$ is 2 mm, and a hologram thickness $h_H$ is 250 μm. Accordingly, as shown in FIG. 2 and FIG. 3C, two of the hologram elements 54 that are adjacent to one another are formed so as to greatly overlap each other.

The respective LEDs 50 are disposed on the LED substrate 58 with the light-emitting surfaces thereof facing the surface side of the hologram recording layer 60, so as to emit light toward the corresponding hologram elements 54. The "light-emission optical axis" of the LED 50 passes through a vicinity of the center of the corresponding hologram element 54 (the axis of symmetry of the truncated cone), and is directed in a direction orthogonal to the LED substrate 58. As described above, the light-emission optical axis is orthogonal to both the fast scanning direction and the slow scanning direction.

It is preferable to use, as the LED array 52, an SLED array that is structured by plural SLED chips (not shown), at which plural self-scanning LEDs (SLEDs) are arrayed, are arrayed in series. An SLED array turns switches on and off by two signal wires, and can make the respective SLEDs emit light selectively. Therefore, data lines can be used in common. By using the SLED array, a smaller number of wires on the LED substrate 58 suffices.

Although not illustrated, the LPH 14 is held by a holding member such as a housing or a holder or the like such that the diffracted lights generated at the hologram elements 54 exit in the direction of the photoreceptor drum 12, and the LPH 14 is mounted to a predetermined position within the image forming unit 11. Note that the LPH 14 is preferably structured so as to be able to move in the optical axis direction of the diffracted lights by an adjusting unit such as adjusting screws (not shown) or the like. The imaging positions (focal plane) of the hologram elements 54 are adjusted by the adjusting unit so as to be positioned on the surface of the photoreceptor drum 12. Further, it is preferable that a protective layer is formed by a covering glass or a transparent resin or the like on the hologram recording surface 60. The adhesion of dust is prevented by the protective layer.

(Operation of LPH)

Next, operation of the above-described LPH 14 will be described briefly.

Figure 4B:
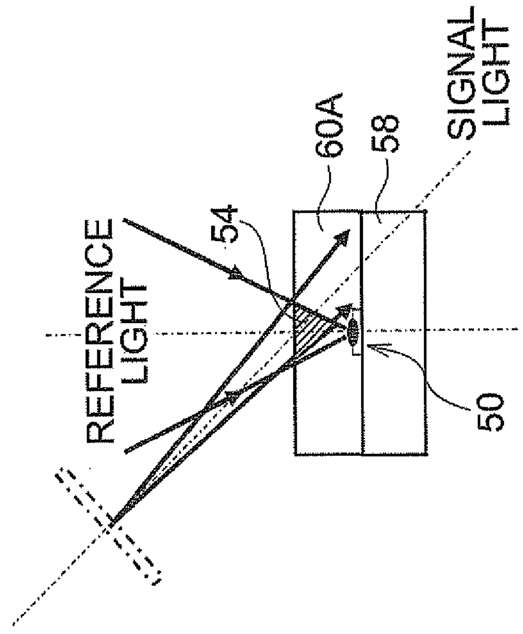
FIG. 4A and FIG. 4B are drawings showing a state in which a hologram element is formed at a hologram recording layer.
Figure 4A:
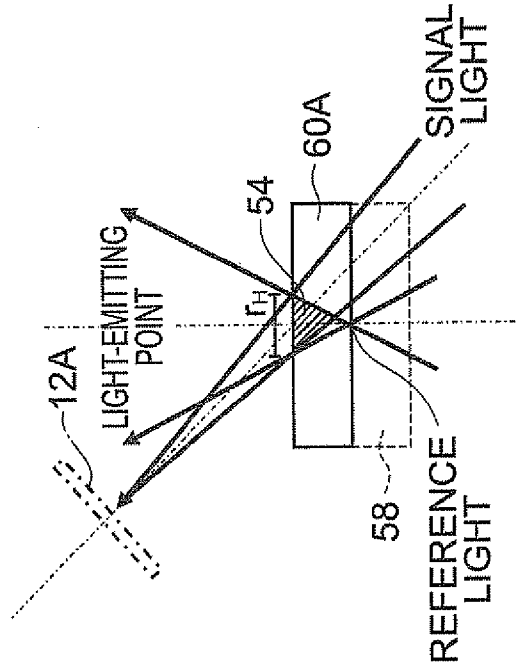

First, the principles of recording/reconstruction of the hologram element 54 will be briefly described. FIG. 4A is a drawing showing a state in which a hologram element is formed at the hologram recording layer. Illustration of the photoreceptor drum 12 is omitted, and only the surface 12A that is the imaging surface is shown. Further, a hologram recording layer 60A is the recording layer before the hologram elements 54 have been formed. The reference letter "A" is added in order to distinguish it from the hologram recording layer 60 at which the hologram elements 54 have been formed.

As shown in FIG. 4A, coherent light, that passes through the optical path of the diffracted light that is to be imaged on the surface 12A, is illuminated as signal light onto the hologram recording layer 60A. Simultaneously, coherent light, that passes through the optical path of the diffused light that spreads from the light-emitting point to the desired hologram diameter $r_H$ at the time of passing through the hologram recording layer 60A, is illuminated onto the hologram recording layer 60A as reference light. A laser light source such as a semiconductor laser or the like is used in the illuminating of the coherent light.

The signal light and the reference light are illuminated onto the hologram recording layer 60A from the same side (the side at which the LED substrate 58 is disposed). The interference fringes (intensity distribution) obtained by interference between the signal light and the reference light are recorded over the depth direction of the hologram recording layer 60A. Due thereto, the hologram recording layer 60 at which the transmission-type hologram elements 54 are formed is obtained. The hologram element 54 is a volume hologram in which the intensity distribution of the interference fringes is recorded in the surface direction and in the depth direction. The LPH 14 is fabricated by mounting the hologram recording layer 60 on the LED substrate 58 to which the LED array 52 is packaged.

The hologram recording layer 60A may be formed so as to contact the LEDs 50, or may be separated therefrom via an air layer, a transparent resin layer, or the like. If the hologram recording layer 60A contacts the LEDs 50, the hologram elements 54 are formed in cone shapes or oval cone shapes. If the hologram recording layer 60A is separated from the LEDs 50, as shown in FIG. 3A, the hologram elements 54 are formed in truncated cone shapes (or truncated oval cone shapes).

Further, although the surface 12A is illustrated schematically in FIG. 4A, the hologram diameter $r_H$ is several mm and the operation distance L is several cm, and therefore, the surface 12A is at a position that is quite far away. Thus, the hologram element 54 is not cone shaped as illustrated, and is formed in a truncated cone shape as shown in FIG. 3A. Further, in the same way as FIG. 4A, FIG. 4B is a drawing showing a state in which a hologram element is formed. Differently than the forming method of FIG. 4A, the signal light and the reference light are illuminated from the obverse side of the hologram recording layer 60A. Namely, the hologram is recorded by phase conjugate waves. This forming method will be described in detail later as the method of manufacturing the LPH 14.

Figure 5A:
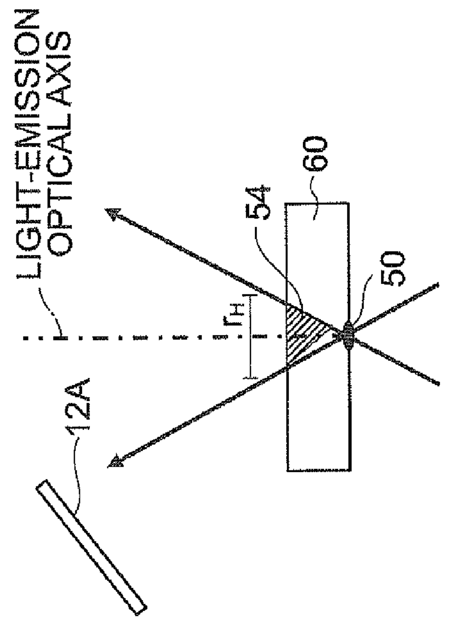
FIG. 5A and FIG. 5B are drawings showing a state in which diffracted light is generated from the hologram element.
Figure 5B:
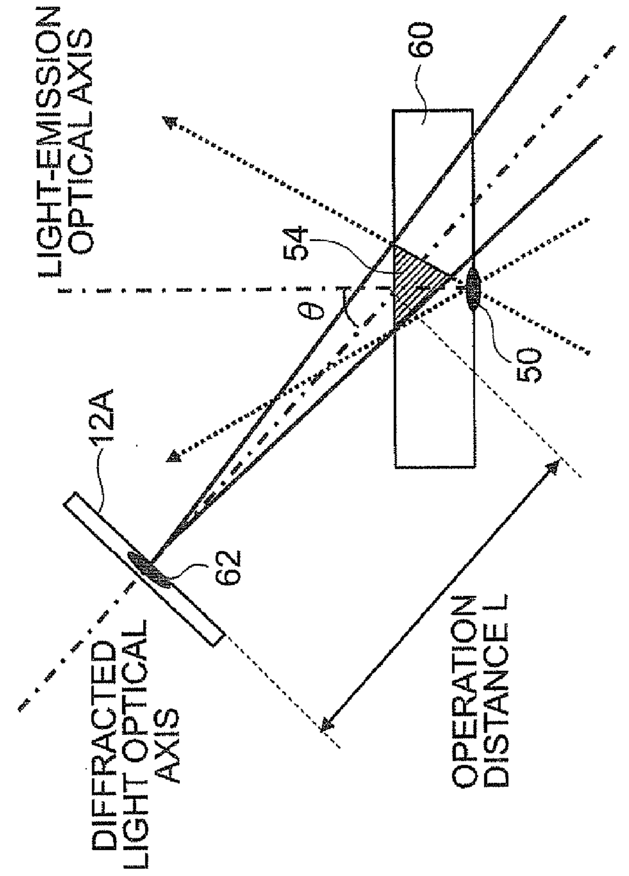

FIG. 5A and FIG. 5B are drawings showing a state in which diffracted light is generated from the hologram element. As shown in FIG. 5A, when the LED 50 is made to emit light, the light emitted from the LED 50 passes through the optical path of the diffused light that spreads from the light-emitting point to the hologram diameter $r_H$. Due to the emission of light by the LED 50, there becomes a situation that is substantially the same as the reference light being illuminated onto the hologram element 54.

As shown in FIG. 5B, due to the illumination of the reference light that is illustrated by the dotted lines, light that is the same as the signal light is reconstructed from the hologram element 54 and is emitted as diffracted light, as shown by the solid lines. The emitted diffracted light is converged, and is imaged onto the surface 12A of the photoreceptor drum 12 at the operation distance of several cm. A spot 62 is formed on the surface 12A. A volume hologram in particular has high incident angle selectivity and wavelength selectivity and accurately reconstructs the signal light, and a minute spot of a distinct outline is formed on the surface 12A.

A volume hologram and a phase-type zone plate that is called a kinoform can obtain a diffraction efficiency of 100% in theory due to the design, with respect to coherent light of a specific wavelength, specific incidence direction. However, even if such a hologram element is used, a decrease in the diffraction efficiency cannot be avoided because spreading of the wavelength distribution and spreading of the exiting angle exist particularly with respect to incoherent light sources. Further, with respect to coherent light sources as well, it is difficult to realize a diffraction efficiency of 100% due to wavelength dispersion of the light source, manufacturing dispersion at the time of fabricating the hologram elements, and the like.

The zero-order diffracted light component that is not diffracted becomes background noise of the collected spot, and impedes the achieving of an imaging performance of high contrast. In the present exemplary embodiment, as shown in FIG. 5B, the light exiting from the LED 50 is illuminated as reference light onto the hologram element 54 that is formed at the hologram recording layer 60. However, some of the light that exits from the LED 50 is transmitted through the hologram recording layer 60 and diffuses without being diffracted at the hologram element 54 (i.e., as zero-order diffracted light). This zero-order diffracted light component is called "transmitted reference light".

Figure 7:
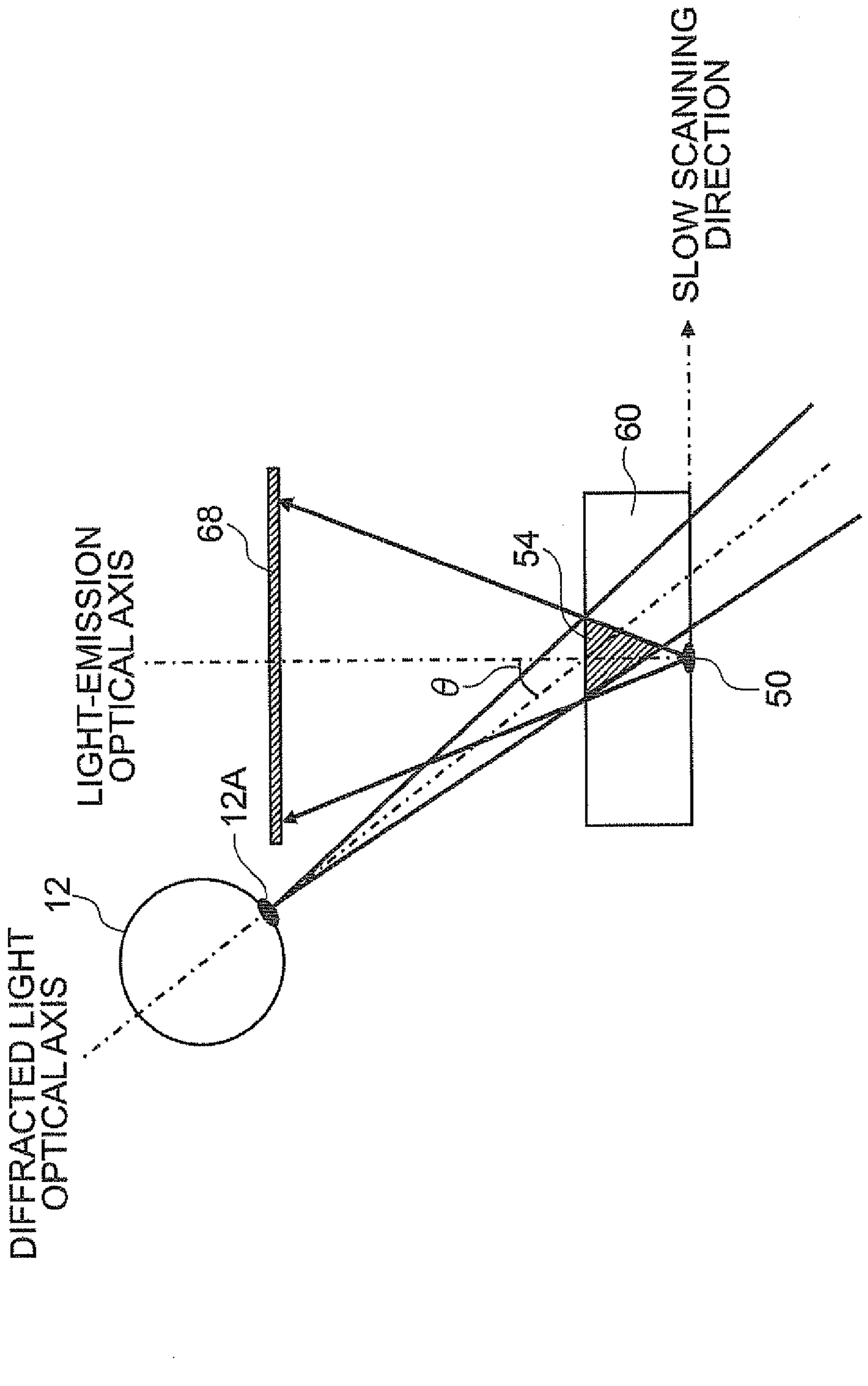
FIG. 7 is a cross-sectional view showing an example of the arrangement relationship between the LED print head and a photoreceptor drum.

FIG. 7 is a cross-sectional view showing an example of the arrangement relationship between the LED print head and the photoreceptor drum. When the hologram element 54 is recorded by making the optical axis of the diffracted light imaged on the surface 12A of the photoreceptor drum 12 and the optical axis of the signal light coincide, and by causing the signal light and the reference light to interfere such that the optical axis of the signal light and the optical axis of the reference light intersect at a predetermined angle θ, the diffracted light exits in a direction that forms the angle θ with the light-emission optical axis.

As described above, the light that exits from the LED 50 passes through the optical path of the diffused light that spreads from the light-emitting point to the hologram diameter $r_H$. In the present exemplary embodiment, the angle θ that is formed by the light-emission optical axis and the diffracted light optical axis is set such that the photoreceptor drum 12 is positioned at the outer side of the optical path of this diffused light. Therefore, the transmitted reference light is not illuminated as background noise onto the photoreceptor drum 12 that is positioned at the outer side of the optical path of the diffused light.

In other words, because the hologram element 54 emits diffracted light at the outer side of the illumination region of the transmitted reference light, the diffracted light does not include a zero-order diffracted light component (transmitted reference light). Due thereto, the background noise due to zero-order diffracted light is reduced, and a spot having high contrast is formed. Further, in order to prevent generation of stray light, it is preferable to place a light-blocking film 68 such as a light absorbing film or the like at the diffused light transmitting side of the hologram recording layer 60. The light-blocking film 68 is disposed on the optical path of the diffused light that is transmitted.

Similarly, as shown in FIG. 2, at the LPH 14 that is provided with the LED array 52 and the hologram element array 56, the respective lights that are emitted from the six LEDs $\mathbf{50}_1$ through $\mathbf{50}_6$ respectively are incident on the corresponding one of the hologram elements $\mathbf{54}_1$ through $\mathbf{54}_6$. The hologram elements $\mathbf{54}_1$ through $\mathbf{54}_6$ diffract the incident lights and generate diffracted lights. Each of the diffracted lights generated by the hologram elements $\mathbf{54}_1$ through $\mathbf{54}_6$ respectively avoid the optical path of the diffused light, and exit in a direction in which the optical axis thereof forms the angle θ with the light-emission optical axis, and is collected in the direction of the photoreceptor drum 12.

The respective diffracted lights that exit are converged in the direction of the photoreceptor drum 12, and are imaged at the surface of the photoreceptor drum 12 that is disposed at the focal plane that is several cm ahead. Namely, each of the plural hologram elements 54 functions as an optical member that diffracts and collects the light emitted from the corresponding LED 50 and images it on the surface of the photoreceptor drum 12. Minute spots $62_1$ through $62_6$ in accordance with the respective diffracted lights are formed on the surface of the photoreceptor drum 12 so as to be arrayed in one row in the fast scanning direction. In other words, the photoreceptor drum 12 is fast-scanned by the LPH 14. Note that, when there is no need to differentiate therebetween, the spots $62_1$ through $62_6$ are collectively called the "spots 62".

(Sizes of Respective Elements of LPH)

An example in which the six LEDs $50_1$ through $50_6$ are arrayed in one row is shown schematically in FIG. 2. However, several thousand of the LEDs 50 are arrayed in accordance with the resolution in the fast scanning direction of the image forming device. To explain by using an SLED array as an example, for example, an SLED array is structured by 58 SLED chips, at each of which 128 LEDs are arrayed at an interval of 1200 spi (spots per inch), being arrayed in series. When calculated, 7424 SLEDs are arrayed at an interval of 21 μm in an image forming device of a resolution of 1200 dpi.

When forming a spot by collecting light by a collective lens, the limit of making the spots minute is derived and determined from the diffraction phenomenon of light. A spot formed by a collective lens is called an Airy disk from the following relational expressions. A diameter $\phi$ of the Airy disk (spot size) is expressed as $\phi=1.22\lambda/NA$ ($=2.44\ \lambda F$), by using wavelength $\lambda$, and numerical aperture NA of the collective lens. Accordingly, given that the operation distance, which substantially corresponds to the focal length, is f, $f=r_H\phi/2.44\lambda$.

$NA=\sin\theta=r_H/2f$

F (F number)$=f/r_H$ f: focal length $f=r_H\phi/2.44\lambda$

At an LPH that uses a conventional hologram element array, each of the plural hologram elements is fabricated at a diameter that is less than or equal to the pitch interval of the LEDs (the light-emitting point pitch) so that the hologram elements do not overlap one another, similarly to a case in which plural lenses are arrayed in respective correspondence with LEDs. The light-emitting point pitch is substantially the same length as the interval between the minute spots formed on the photoreceptor drum (the pixel pitch), and is several tens of μm. At a hologram element of a diameter of several tens of μm, due to the spreading (diffraction limit) of the beam due to diffraction, only an operation distance of the order of several mm can be obtained in the same way as a rod lens. In contrast, in the present exemplary embodiment, by making the diameter of the hologram element larger than the light-emitting point pitch, an operation distance of the cm order is realized.

For example, conventionally, when the diameter of a hologram element is made to be less than or equal to the light-emitting point pitch, at a resolution of 1200 dpi, the hologram size $r_H$ must be made to be less than or equal to around 20 μm. At this time, if the wavelength is made to be 780 nm, 420 μm at the highest is the limit of the operation distance, even if the spot size $\phi$ is permitted to around 40 μm. In this way, in the conventional art, the operation distance cannot made to be long to the cm order.

On the other hand, if the diameter of the hologram element is made to be larger than the light-emitting point pitch as in the present exemplary embodiment, the operation distance becomes long to the cm order. For example, by making the diameter (hologram diameter $r_H$) of the hologram element 54, that functions as a collective lens, be greater than or equal to 1 mm, the operation distance becomes greater than or equal to 1 cm. For example, as will be described later, if the hologram diameter $r_H$=2 mm and the hologram thickness $h_H$=250 μm, a spot size $\phi$ of around 40 μm (around 30 μm at half value width) is realized at an operation distance of 4 cm.

As described above, the diameter of the hologram element may be made to be greater than or equal to 1 mm. Further, if the diameter of the hologram element exceeds 10 mm, the multiplicity of the hologram elements becomes very high. Therefore, the problem arises that the diffraction efficiency, that is limited by the dynamic range of the material, decreases. Accordingly, the diameter of the hologram element may be made to be less than or equal to 10 mm.

(Method of Manufacturing LPH)

Next, the method of manufacturing the LPH 14 will be described. FIG. 6A through FIG. 6E are process diagrams showing the manufacturing process of the LED print head. A summary thereof is as described as the principles of recording/reconstruction of the hologram element 54. Here, because cross-sectional views in the slow scanning direction are illustrated, only one of each of the LED 50 and the hologram element 54 are shown, but description will be given as a method of manufacturing the LPH 14 that is equipped with the LED array 52 and the hologram element array 56.

Figure 6A:
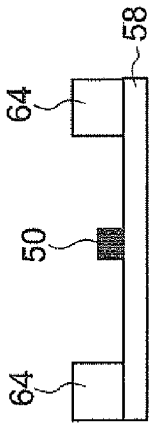
FIG. 6A through FIG. 6E are process diagrams showing a manufacturing process of the LED print head.

First, as shown in FIG. 6A, the LED array 52, at which the plural LEDs 50 are packaged on the LED substrate 58, is readied. An embankment portion 64, for damming-up the photopolymer, is formed in the shape of a frame at the peripheral portion of the surface of the LED substrate 58. For example, after a curable polymer is coated to substantially the same thickness as the hologram recording layer 60, the embankment portion 64 is formed by curing the curable polymer by heating or by illuminating light. For example, if thin volume holograms are to be recorded, the thickness of the hologram recording layer 60 is around several hundred μm, and similarly, the embankment portion 64 of a thickness of several hundred μm is formed. When recording thick volume holograms, the thickness of the hologram recording layer 60 is in the range of 1 mm to 10 mm, and similarly, the embankment portion 64 of a thickness of 1 mm to 10 mm is formed.

Figure 6B:
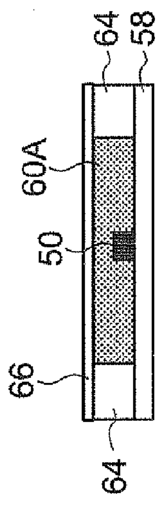

Next, as shown in FIG. 6B, the hologram recording layer 60A is formed by causing a photopolymer to flow-in from a dispenser, to the extent that it does not overflow from the embankment portion 64, on the LED substrate 58 at whose peripheral portion the frame-shaped embankment portion 64 is formed. Next, the protective layer 66 is formed on the hologram recording layer 60A by attaching a cover glass, that is thin-plate-shaped and transparent with respect to the recording light and the reconstruction light, on the surface of the hologram recording layer 60A, or the like. Thereafter, chip alignment inspection is carried out, and the positions of the plural LEDs 50 that are the light-emitting points are measured.

Figure 6C:
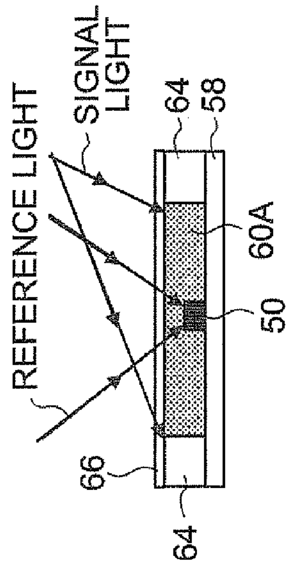

Next, as shown in FIG. 6C, the signal light and the reference light are illuminated simultaneously from the protective layer 66 side onto the hologram recording layer 60A that is formed from a photopolymer, and the plural hologram elements 54 are formed at the hologram recording layer 60A. Laser light that passes, in the opposite direction, through the optical path of the desired diffracted light is illuminated as the signal light. Further, laser light, that passes through the optical path of the converged light that is converged from the desired hologram diameter $r_H$ to the light-emitting point when passing through the hologram recording layer 60A, is illuminated as the reference light. Namely, as shown in FIG. 4B, a hologram is recorded by phase conjugate waves. For example, laser lights of a wavelength of 780 nm, that are oscillated from semiconductor lasers, are used as the laser lights for the signal light and the reference light.

First, the signal light and the reference light, such as the illumination positions of the laser lights, the illumination angles, the spread angles, the converging angles and the like, are designed from the measurement data obtained by the aforementioned chip alignment inspection and the design values of the hologram element 54 (the hologram diameter $r_H$, the hologram thickness $h_H$). Here, the signal light is designed so as to exit in a direction in which the optical axis of the diffracted light generated at the hologram element 54 (the reconstructed signal light) forms the angle θ with the light-emission optical axis, and so as to be collected in the direction of the photoreceptor drum 12. Then, the writing optical systems for illuminating the designed signal light and reference light are placed.

With the writing optical systems placed and fixed, spherical waves that converge are used as the reference light, and the LED substrate 58 on which the hologram recording layer 60A is formed is moved with respect to the signal light and the reference light. The LED substrate 58 is moved at the light-emitting point pitch such that the reference light is successively converged at each of the plural LEDs 50. The plural hologram elements 54 are multiplex-recorded at the hologram recording layer 60A by spherical wave shift multiplexing.

Figure 6D:
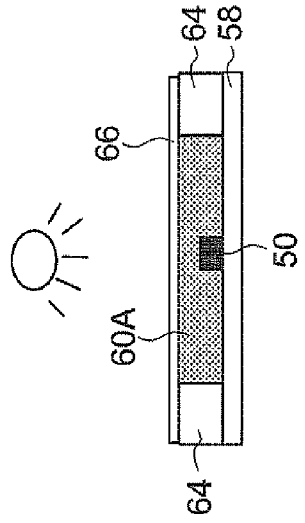

Next, as shown in FIG. 6D, the entire surface of the hologram recording layer 60A is exposed by ultraviolet ray irradiation, and the photopolymerizable monomer is completely polymerized. Due to this fixing processing, the refractive index distribution is fixed at the hologram recording layer 60A. For example, a photopolymer is provided as a mixture of a photopolymerizable monomer and another non-photopolymerizable compound. In this case, when interference fringes are illuminated onto the photopolymer, at the light portions, the photopolymerizable monomer is polymerized, and a density gradient arises at the photopolymerizable monomer. As a result, the photopolymerizable monomer diffuses to the light portions, and a refractive index distribution arises at the light portions and the dark portions.

Next, the entire surface is exposed, the photopolymerizable monomer remaining at the dark portions is polymerized such that the polymerization reaction is completed, and there is a state in which writing and deletion cannot be carried out. Note that methods based on various recording mechanisms are proposed as the hologram recording material. A material may be used as the hologram recording material in the present invention provided that it is a material at which refractive index modulation corresponding to a light intensity distribution can be recorded.

Figure 6E:
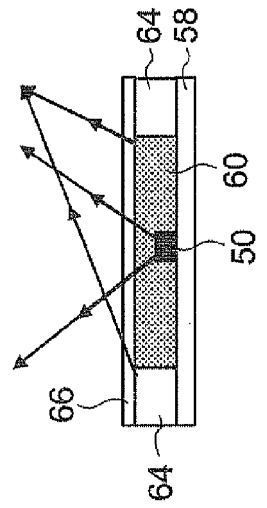

Finally, as shown in FIG. 6E, the plural LEDs 50 are successively made to emit light, and it is inspected whether or not the desired diffracted lights are obtained by the hologram elements 54 formed in correspondence with the respective LEDs 50. Due to this inspection process, the entire manufacturing process is finished.

Note that the above exemplary embodiment describes an example in which the LEDs 50 and the hologram recording layer 60A are contacting. However, the hologram recording layer 60A may be formed so as to be separated from the LEDs 50 via an air layer or a transparent resin layer or the like. At this time, a sheet, that is formed from a hologram recording layer sandwiched by protective layers, may be fabricated separately and may be placed on the light-emitting element array.

Second Exemplary Embodiment

Figure 8:
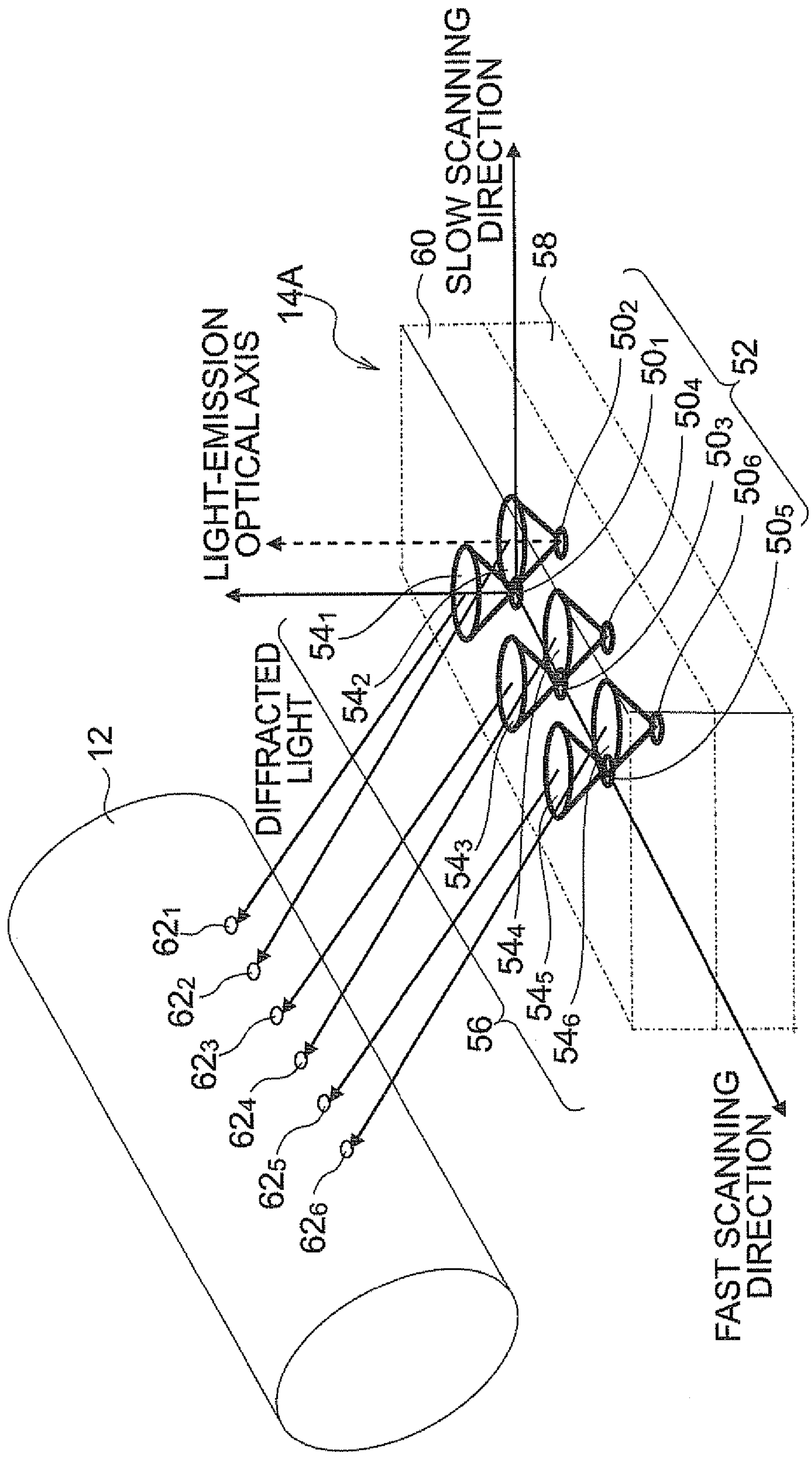
FIG. 8 is a schematic perspective view showing an example of the structure of an LED print head relating to a second exemplary embodiment.

FIG. 8 is a schematic perspective view showing an example of the structure of an LED print head relating to a second exemplary embodiment. Other than the array of the plural LEDs 50 at the LED array 52 and the array of the plural hologram elements 54 at the hologram element array 56 being changed, the structures are the same as those of the image forming device and the LED print head relating to the first exemplary embodiment. Therefore, the same structural portions are denoted by the same reference numerals, and description thereof is omitted. Further, the LED substrate 58 and the hologram recording layer 60 are shown by imaginary lines.

As shown in FIG. 8, in the same way as in the first exemplary embodiment, an LPH 14A relating to the second exemplary embodiment has the LED array 52 equipped with the plural LEDs 50, and the hologram element array 56 equipped with the plural hologram elements 54 that respectively correspond to the plural LEDs 50. In this example, the LED array 52 has the six LEDs $\mathbf{50}_1$ through $\mathbf{50}_6$, and the hologram element array 56 has the six hologram elements $\mathbf{54}_1$ through $\mathbf{54}_6$.

The plural LEDs 50 are arrayed in a staggered form along the fast scanning direction. In this example, three of the LEDs that are the LED $\mathbf{50}_1$, the LED $\mathbf{50}_3$ and the LED $\mathbf{50}_5$ are arrayed on a first straight line that is parallel to the fast scanning direction, and three of the LEDs that are the LED $\mathbf{50}_2$, the LED $\mathbf{50}_4$ and the LED $\mathbf{50}_6$ are arrayed on a second straight line that is parallel to the fast scanning direction. The first straight line and the second straight line are set apart by a uniform interval in the slow scanning direction. The interval between the first straight line and the second straight line is an interval that is substantially the same as the light-emitting point pitch. In other words, all of the LEDs 50 that structure the LED array 52 (the six LEDS $\mathbf{50}_1$ through $\mathbf{50}_6$) are disposed so as to be offset in the slow scanning direction so as to not be positioned on a single straight line.

Further, the respective LEDs 50 are arrayed such that the interval (the light-emitting point pitch) in the fast scanning direction of two of the LEDs 50 (light-emitting points) that are adjacent to one another is a uniform interval. For example, the interval in the fast scanning direction between the LED $\mathbf{50}_1$ and the LED $\mathbf{50}_2$, and the interval in the fast scanning direction between the LED $\mathbf{50}_2$ and the LED $\mathbf{50}_3$ are equal. By arranging the plural LEDs 50 in a staggered form, the light-emitting point pitch is narrowed.

The respective hologram elements 54 are disposed in a staggered form along the fast scanning direction in correspondence with the respective LEDs 50 and in the same way as the LEDs 50. Further, the respective hologram elements 54 are arrayed such that the interval in the fast scanning direction between two of the hologram elements 54 that are adjacent to one another is the same interval as the aforementioned light-emitting point pitch.

Note that, in the example shown in FIG. 8, the plural hologram elements 54 are illustrated so as to not overlap one another. However, as described above, in order to obtain an operation distance of the order of several cm, the hologram diameter $r_H$ must be made to be of the order of several mm. Accordingly, when the plural LEDs 50 are disposed so as to be close, the plural hologram elements 54 are formed such that the two hologram elements 54 that are adjacent to one another overlap one another.

Figure 9A:
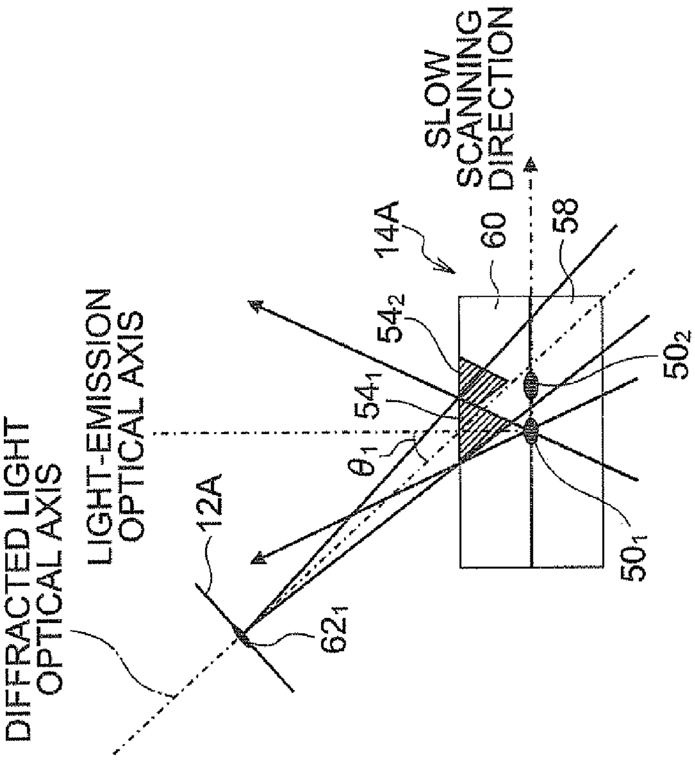
FIG. 9A and FIG. 9B are drawings showing a state in which diffracted light is generated from a hologram element.
Figure 9B:
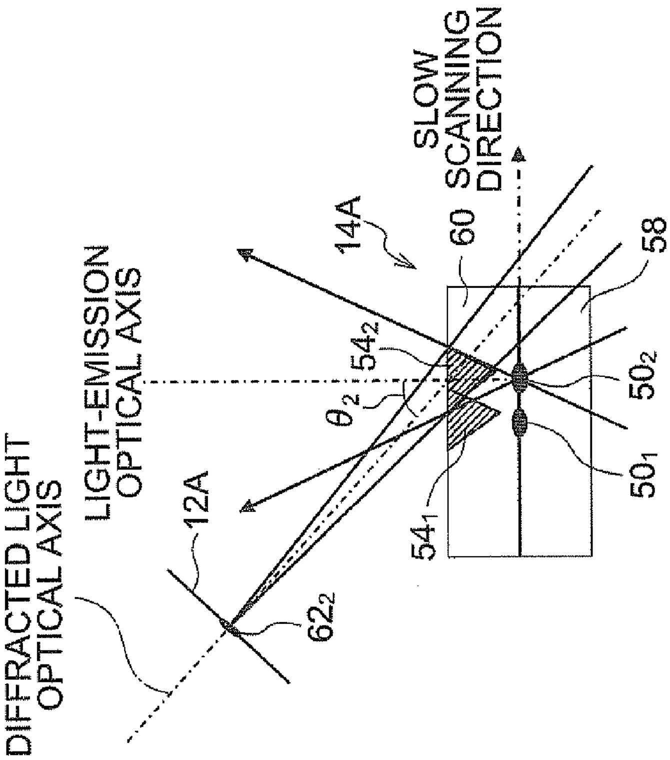

FIG. 9A and FIG. 9B are drawings showing the state in which diffracted light is generated from the hologram element. When the LED 50 is made to emit light, the light emitted from the LED 50 passes through the optical path of the diffused light that spreads from the light-emitting point to the hologram diameter $r_H$. Due to the emission of light by the LED 50, a situation arises that is substantially the same as reference light being illuminated onto the hologram element 54. Due to the illumination of reference light, light that is the same as the signal light is reconstructed from the hologram element 54, and exits as diffracted light. The diffracted light that exits is converged, and is imaged onto the surface 12A of the photoreceptor drum 12 at an operation distance of several cm. The spot 62 is formed on the surface 12A.

The second straight line is apart from the first straight line by a uniform interval in the slow scanning direction. As shown in FIG. 9A, each of the lights that are emitted from the three LEDs 50 arrayed on the first straight line that are the LED $50_1$, the LED $50_3$, the LED $50_5$ is diffracted, by the corresponding hologram element $54_1$, hologram element $54_3$, hologram element $54_5$, in a direction that forms angle $\theta_1$ with the light-emission optical axis. Further, as shown in FIG. 9B, each of the lights that is emitted from the three LEDs 50 arrayed on the second straight line that are the LED $50_2$, the LED $50_4$, the LED $50_6$ are diffracted, by the corresponding hologram element $54_2$, hologram element $54_4$, hologram element $54_6$, in a direction that forms angle $\theta_2$ with the light-emission optical axis.

Note that, in FIG. 9A and FIG. 9B, the "LED $50_1$" is illustrated as an LED arrayed on the first straight line, and the "LED $50_2$" is illustrated as an LED arrayed on the second straight line. Further, in the same way as in the first exemplary embodiment, the angle $\theta_1$, the angle $\theta_2$, that is formed by the light-emission optical axis and the diffracted light optical axis, is set such that the photoreceptor drum 12 is positioned at the outer side of the optical path of the diffused light that spreads from the LED 50 (light-emitting point) to the hologram diameter $r_H$. This diffused light is not illuminated onto the photoreceptor drum 12 as background light.

The respective diffracted lights that exit are converged in the direction of the photoreceptor drum 12, and are imaged at the surface of the photoreceptor drum 12 that is disposed at the focal plane that is several cm ahead. Spot $62_1$, spot $62_3$, spot $62_5$ are formed on the surface 12A of the photoreceptor drum 12 by the hologram element $54_1$, the hologram element $54_3$, the hologram element $54_5$. Further, spot $62_2$, spot $62_4$, spot $62_6$ are formed by the hologram element $54_2$, the hologram element $54_4$, the hologram element $54_6$.

As shown in FIG. 8, the spots $62_1$ through $62_6$ formed by the respective diffracted lights are formed so as to be arrayed in one row in the fast scanning direction. As shown in FIG. 9A and FIG. 9B, the plural LEDs 50 are arrayed in a staggered form, and are distributed in the slow scanning direction. The angle $\theta_1$, the angle $\theta_2$, that determine the diffracting directions, are set such that the spots 62 are arrayed in one row in the fast scanning direction in accordance with their positions in the slow scanning direction (i.e., whether a spot is on the first straight line or whether it is on the second straight line). By setting the angle $\theta_1$, the angle $\theta_2$ appropriately, the spots $62_1$ through $62_6$ are formed in one row in the fast scanning direction even if each of the plural LEDs that are arrayed in a staggered form are not made to emit light at different timings.

In other words, all of the LEDs $50_1$ through $50_6$ that structure the LED array 52 are disposed so as to be offset in the slow scanning direction so as to not be positioned on a single straight line. For example, the three LEDs that are the LED $50_1$, the LED $50_2$, the LED $50_3$ are not positioned on a single straight line. Note that, if the LED array 52 only includes two of the LEDs 50 in total, the two LEDs 50 will be positioned on a single straight line. Therefore, the LED array 52 of the present exemplary embodiment is a structure that includes three or more LEDs 50.

On the other hand, the six hologram elements $54_1$ through $54_6$ are provided so as to correspond to the LEDs $50_1$ through $50_6$, respectively. The spots $62_1$ through $62_6$, that are diffracted and collected by these six hologram elements $54_1$ through $54_6$ and are formed on the surface 12A of the photoreceptor drum 12, are positioned substantially on a single straight line.

Note that, here, "positioned substantially on a single straight line" includes cases in which the spots are positioned on a single straight line within a range of errors in design. Further, the above describes an example in which the plural LEDs 50 are arrayed in a staggered form. However, even if the plural LEDs 50 are arrayed randomly, it suffices to appropriately design the corresponding hologram elements 54 such that the spots 62 are positioned substantially on a single straight line.

Third Exemplary Embodiment

Figure 10:
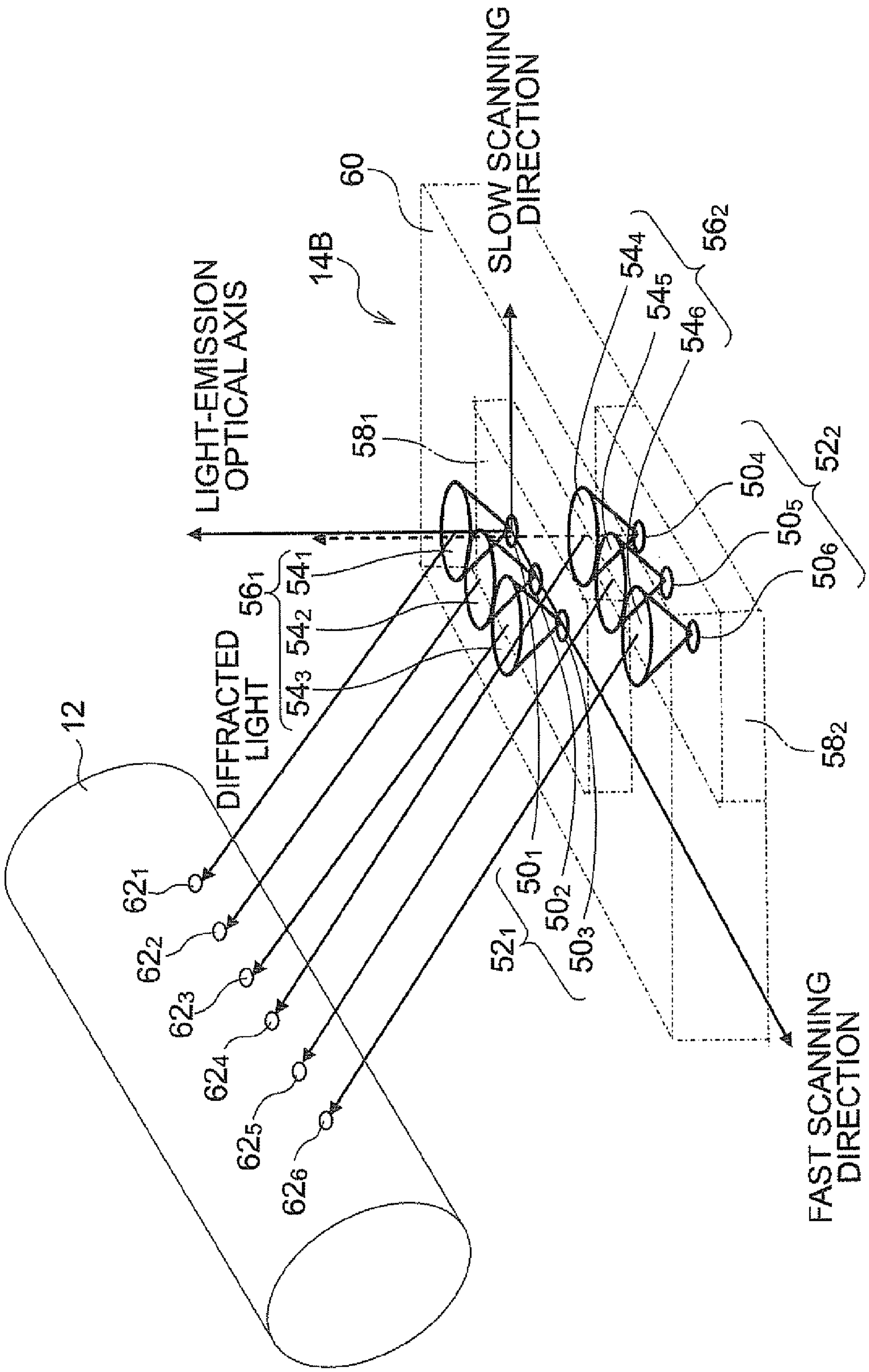
FIG. 10 is a schematic perspective view showing an example of the structure of an LED print head relating to a third exemplary embodiment.

FIG. 10 is a schematic perspective view showing an example of the structure of an LED print head relating to a third exemplary embodiment. Other than the plural LEDs 50 at the LED array 52 being arrayed in a staggered form in units of chips, the structures are the same as those of the image forming device and the LED print head relating to the first exemplary embodiment. Therefore, the same structural portions are denoted by the same reference numerals, and description thereof is omitted. Further, the LED substrate 58 (an LED chip $58_1$, an LED chip $58_2$ that will be described hereinafter) and the hologram recording layer 60 are shown by imaginary lines.

As mentioned above, an SLED array, that is structured by plural SLED chips at which plural SLEDs are arrayed being arrayed in series, can be used as the LED array 52. In this way, if a plurality of chips at which plural LEDs are arrayed are arranged, the plural LEDs can be arrayed in a staggered form in chip units.

As shown in FIG. 10, an LPH 1413 relating to the third exemplary embodiment has the LED chip $58_1$ at which three LEDs that are the LED $50_1$, the LED $50_2$ and the LED $50_3$ are packaged on an elongated LED substrate, and the LED chip $58_2$ at which three LEDs that are the LED $50_4$, the LED $50_5$ and the LED $50_6$ are packaged on an elongated LED substrate. The LED chip $58_1$ and the LED chip $58_2$ are disposed so as to be lined-up in the fast scanning direction, and are disposed so as to be offset by a uniform interval in the slow scanning direction.

Even when allotted between the LED chip $58_1$ and the LED chip $58_2$, the respective LEDs 50 are arrayed such that the interval (light-emitting point pitch) in the fast scanning direction of two LEDs 50 (light-emitting points) that are adjacent to one another is a uniform interval. For example, the interval in the fast scanning direction between the LED $50_2$ and the LED $50_3$ is equal to the interval in the fast scanning direction between the LED $50_3$ and the LED $50_4$.

The three LEDs 50 that are the LED $50_1$, the LED $50_2$ and the LED $50_3$ are arrayed on a first straight line that runs along the fast scanning direction, such that an LED array $52_1$ is structured. Further, the three LEDs 50 that are the LED $50_4$, the LED $50_5$ and the LED $50_6$ are arrayed on a second straight line that runs along the fast scanning direction, such that an LED array $52_2$ is structured. The first straight line and the second straight line are separated at a uniform interval in the slow scanning direction. The interval between the first straight line and the second straight line is substantially the same interval as the light-emitting point pitch.

The hologram recording layer 60 is formed on the LED chip $58_1$ and the LED chip $58_2$ so as to cover the LED chip $58_1$ and the LED chip $58_2$. The plural hologram elements 54 are formed at the hologram recording layer 60 along the fast scanning direction in respective correspondence with the plural LEDs 50. The respective hologram elements 54 are arrayed such that the interval in the fast scanning direction between the two hologram elements 54 that are adjacent to one another is the same interval as the aforementioned light-emitting point pitch.

Specifically, the three hologram elements that are the hologram element $54_1$, the hologram element $54_2$ and the hologram element $54_3$ are formed in respective correspondence with the three LEDs 50 of the LED chip $58_1$. Further, the three hologram elements that are the hologram element $54_1$, the hologram element $54_2$ and the hologram element $54_3$ are formed in respective correspondence with the three LEDs 50 of the LED chip $58_2$. Note that, in the example shown in FIG. 10, the plural hologram elements 54 are illustrated so as to not overlap one another. However, as described above, the plural hologram elements 54 are formed such that the two hologram elements 54 that are adjacent to one another overlap one another.

In the same way as in the example shown in FIG. 9A and FIG. 9B, the lights emitted from the LEDs 50 that are on the first straight line are diffracted in a direction of forming the angle $\theta_1$ with the light-emission optical axis, and the lights emitted from the LEDs 50 that are on the second straight line are diffracted in a direction of forming the angle $\theta_2$ with the light-emission optical axis. Further, in the same way as in the first exemplary embodiment, the angle $\theta_1$, the angle $\theta_2$, that are formed by the light-emission optical axes and the diffracted light optical axes, are set such that the photoreceptor drum 12 is positioned at the outer side of the optical paths of the diffused lights that spread from the LEDs 50 (light-emitting points) to the hologram diameters $r_H$. Therefore, these diffused lights (zero-order diffracted lights) are not illuminated onto the photoreceptor drum 12 as background light.

In the present exemplary embodiment, each light, that exits from the three LEDs that are the LED $50_1$, the LED $50_2$, the LED $50_3$ that are arrayed on the first straight line, is diffracted in a direction that forms the angle $\theta_1$ with the light-emission optical axis, by the corresponding hologram element $54_1$, hologram element $54_2$, hologram element $54_3$. Further, each light, that exits from the three LEDs that are the LED $50_4$, the LED $50_5$, the LED $50_6$ that are arrayed on the second straight line, is diffracted in a direction that forms the angle $\theta_2$ with the light-emission optical axis, by the corresponding hologram element $54_4$, hologram element $54_5$, hologram element $54_6$.

As shown in FIG. 10, the respective diffracted lights that exit are converged in the direction of the photoreceptor drum 12, and are imaged at the surface of the photoreceptor drum 12 that is disposed at the focal plane that is several cm ahead. The spots $62_1$ through $62_6$ are formed on the surface 12A of the photoreceptor drum 12 in correspondence with the hologram elements $54_1$ through $54_6$, and so as to be lined-up in one row in the fast scanning direction. The plural LED chips $58_1$, $58_2$ are arranged in a staggered form, and the plural LEDs 50 are disposed so as to be distributed in the slow scanning direction. By setting the angle $\theta_1$, the angle $\theta_2$ appropriately in accordance with the slow scanning direction positions of the LEDs 50, the spots $62_1$ through $62_6$ are formed in one row in the fast scanning direction even if the respective plural LEDs are not made to emit lights at different timings at each of the LED chips that are arranged in a staggered form.

Note that, in the example shown in FIG. 10, an example is shown in which the two LED chips $58_1$, $58_2$, on each of which three of the LEDs 50 are packaged, are arranged in a staggered form. However, the LED chips 58 at which even more of the LEDs 50 are packaged may be used, and even more of the LED chips 58 may be arranged in a staggered form.

Figure 11:
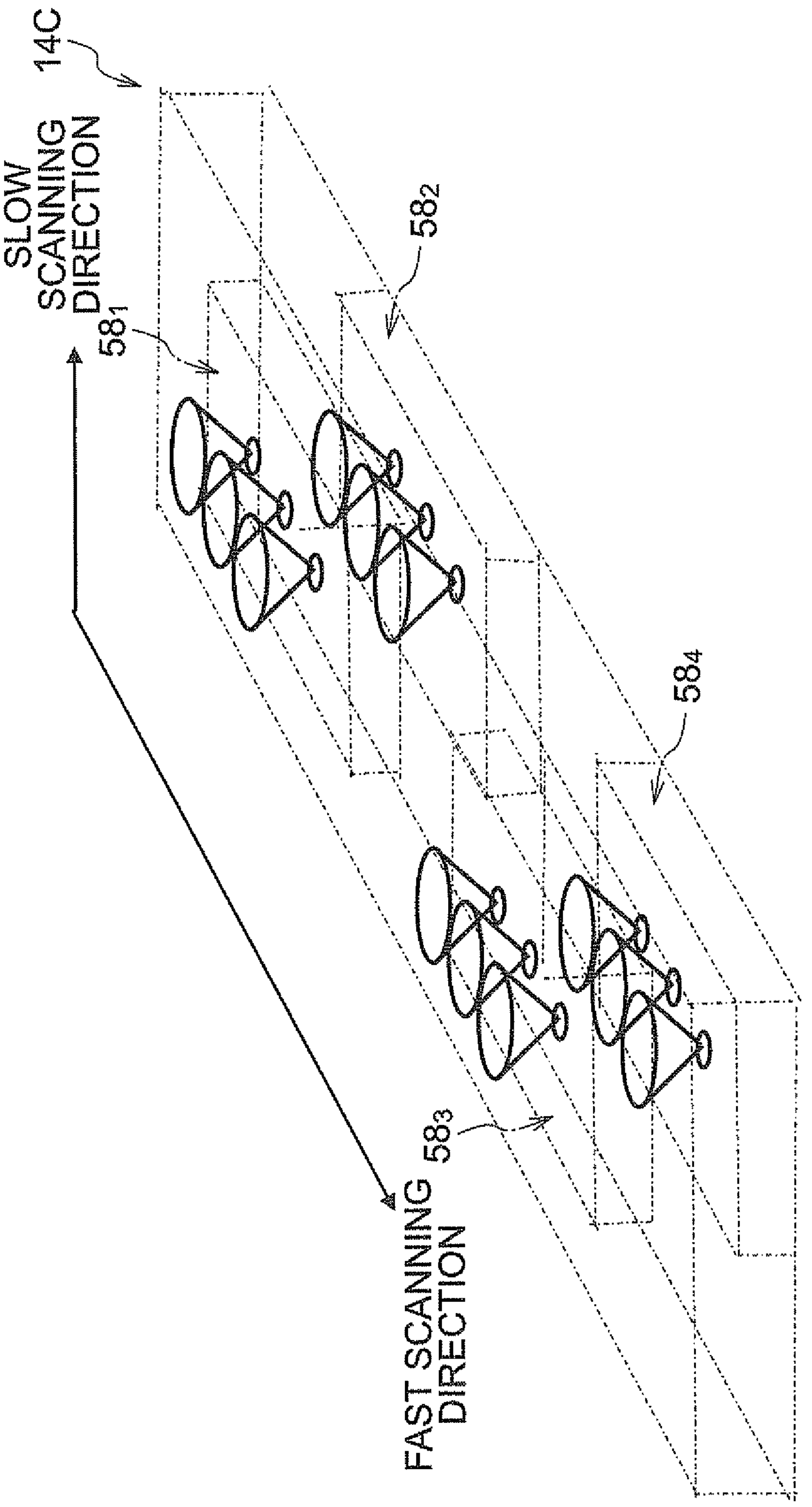
FIG. 11 is a schematic perspective view showing an example of the structure of an LED print head relating to a modified example of the third exemplary embodiment.

FIG. 11 is a schematic perspective view showing an example of the structure of an LED print head relating to a modified example of the third exemplary embodiment. For example, as shown in FIG. 11, an LPH 14C relating to the modified example has four of the LED chips $58_1$, $58_2$, $58_3$, $58_4$ on each of which three of the LEDs 50 are packaged. The four LED chips may be arranged in a staggered form such that the LED chips $58_1$, $58_3$ are disposed on a first straight line, the LED chips $58_3$, $58_4$ are disposed on a second straight line.

Fourth Exemplary Embodiment

Figure 12:
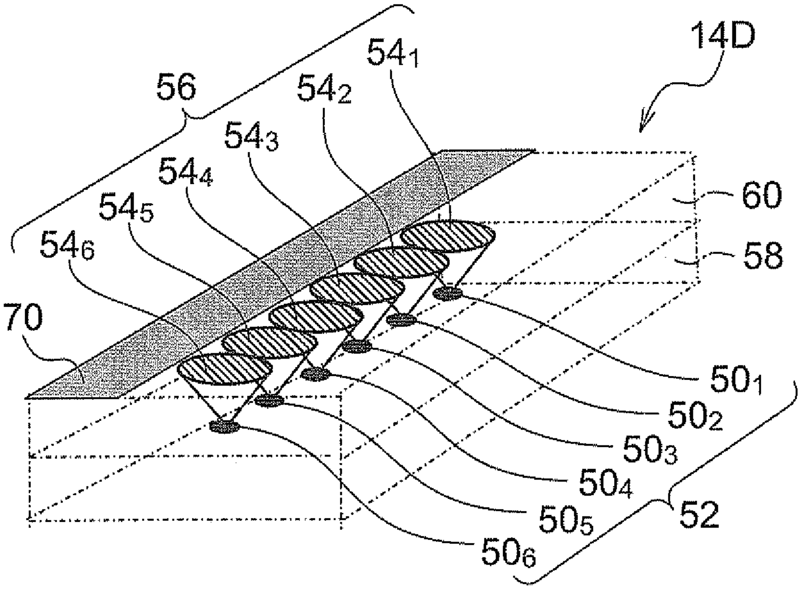
FIG. 12 is a schematic perspective view showing an example of the structure of an LED print head relating to a fourth exemplary embodiment.
Figure 13:
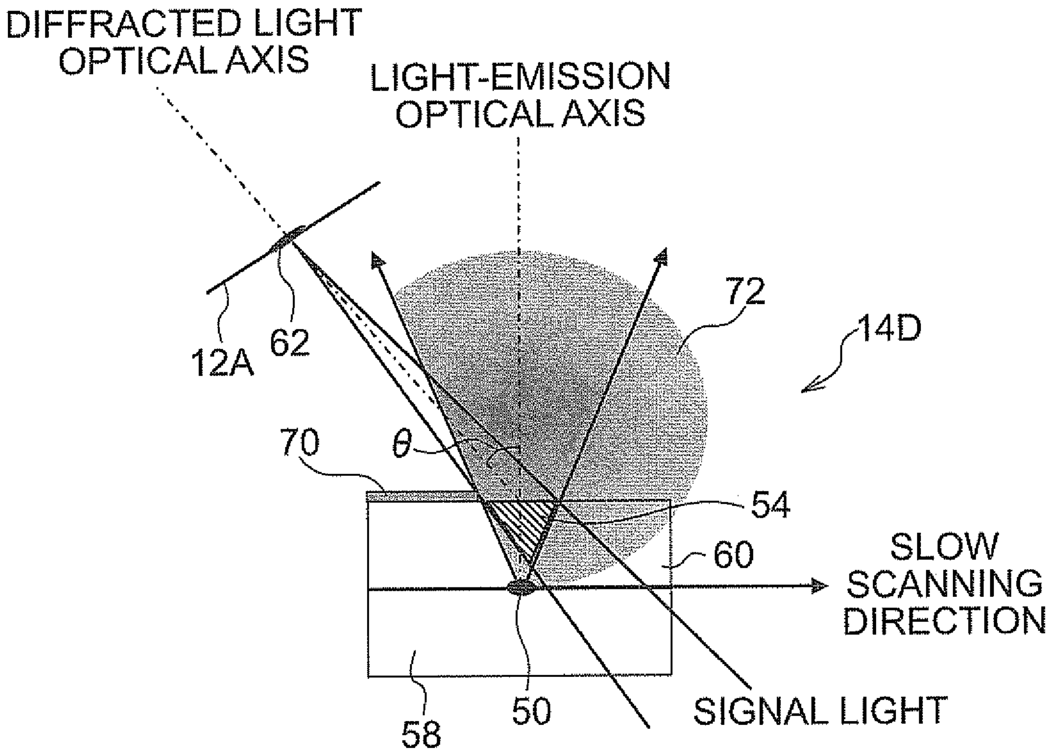
FIG. 13 is a cross-sectional view in a slow scanning direction of the LED print head.

FIG. 12 is a schematic perspective view showing an example of the structure of an LED print head relating to a fourth exemplary embodiment. FIG. 13 is a cross-sectional view in the slow scanning direction of the LED print head. Other than providing a light-blocking body, that blocks zero-order diffracted light in accordance with Lambertian orientation, at the LED print head, the structures are the same as those of the image forming device and the LED print head relating to the first exemplary embodiment. Therefore, the same structural portions are denoted by the same reference numerals, and description thereof is omitted. Note that, in FIG. 12, illustration of the surface 12A of the photoreceptor drum 12 is omitted, and the LED substrate 58 and the hologram recording layer 60 are shown by imaginary lines.

As shown in FIG. 12, in the same way as in the first exemplary embodiment, an LPH 14D relating to the fourth exemplary embodiment has the LED array 52 equipped with the plural LEDs 50, and the hologram element array 56 equipped with the plural hologram elements 54 that respectively correspond to the plural LEDs 50. The LED array 52 is packaged on the LED substrate 58, and the hologram element array 56 is formed at the hologram recording layer 60.

A light-blocking body 70, that is elongated and extends in the fast scanning direction, is provided at the obverse of the hologram recording layer 60. The elongated light-blocking body 70 is disposed so as to be adjacent, at the photoreceptor drum 12 side, to a plane in which the optical paths of the diffracted lights that are diffracted by the hologram elements 54 (the reconstructed signal lights) and the obverse of the hologram recording layer 60 intersect. Namely, the light-blocking body 70 is disposed so as to avoid the optical paths of the diffused lights (reference lights) that spread from the light-emitting points to the hologram diameters $r_H$, and the optical paths of the diffracted lights (signal lights) that are diffracted by the hologram elements 54.

Note that, in the same way as in the first exemplary embodiment, the LED array 52 has the six LEDs $50_1$ through $50_6$. The six LEDs $50_1$ through $50_6$ are arrayed in a row at a uniform interval (light-emitting point pitch) along the fast scanning direction. Further, in the same way as in the in the first exemplary embodiment, the hologram element array 56 has the six hologram elements $54_1$ through $54_6$. The six hologram elements $54_1$ through $54_6$ are arrayed in a row at a uniform interval (the same pitch as the light-emitting point pitch) along the fast scanning direction.

Figure 14:
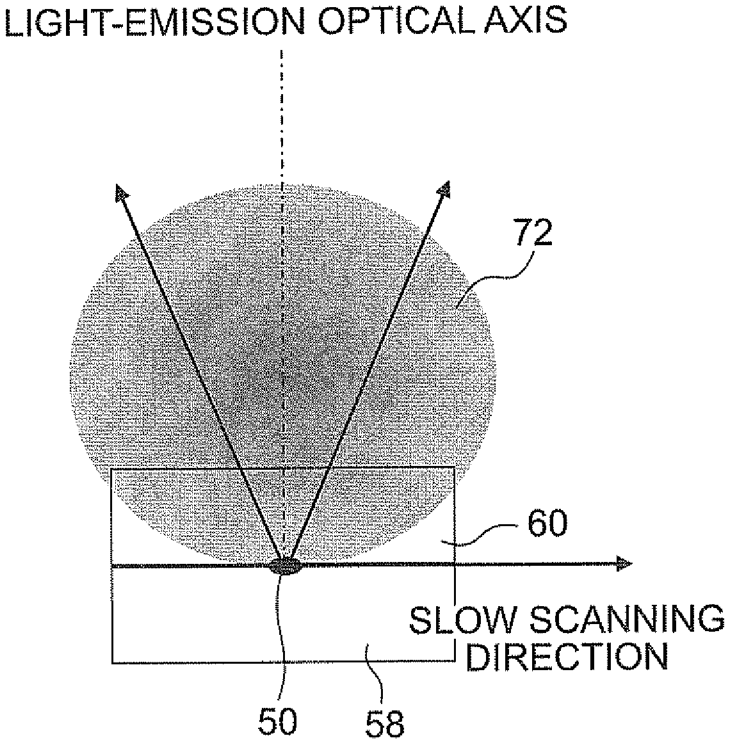
FIG. 14 is a schematic drawing showing the Lambertian light distribution of an incoherent light source.

It is known that emitted light 72, that exits from the LED 50 that is an incoherent light source, diverges and spreads as shown in FIG. 14. This phenomenon is called the "Lambertian light distribution". A similar phenomenon is observed even with an electroluminescent element (EL) that similarly is an incoherent light source. Of the emitted light 72, only the light that passes through the optical path (shown by the solid lines) of the diffused light that spreads from the light-emitting point to the hologram diameter $r_H$, is illuminated onto the hologram element 54 as reference light, and diffracted light is reconstructed. The other emitted light 72 diffuses as "stray light". Note that the point that the zero-order diffracted light (transmitted reference light), that is transmitted through the hologram recording layer 60, is not illuminated onto the photoreceptor drum 12 is similar to the first exemplary embodiment.

As shown in FIG. 13, when the LED 50 is made to emit light, a situation arises that is substantially the same as reference light being illuminated onto the hologram element 54. Light that is the same as the signal light is reconstructed from the hologram element 54, and exits as diffracted light. The exiting diffracted light is converged, and is imaged onto the surface 12A of the photoreceptor drum 12 at an operation distance of several cm. The spot 62 is fowled on the surface 12A. The light-emitting body 70 blocks light other than the diffracted light that is diffracted by the hologram element array 56, and prevents stray light from being illuminated onto the photoreceptor drum 12.

Figure 15:
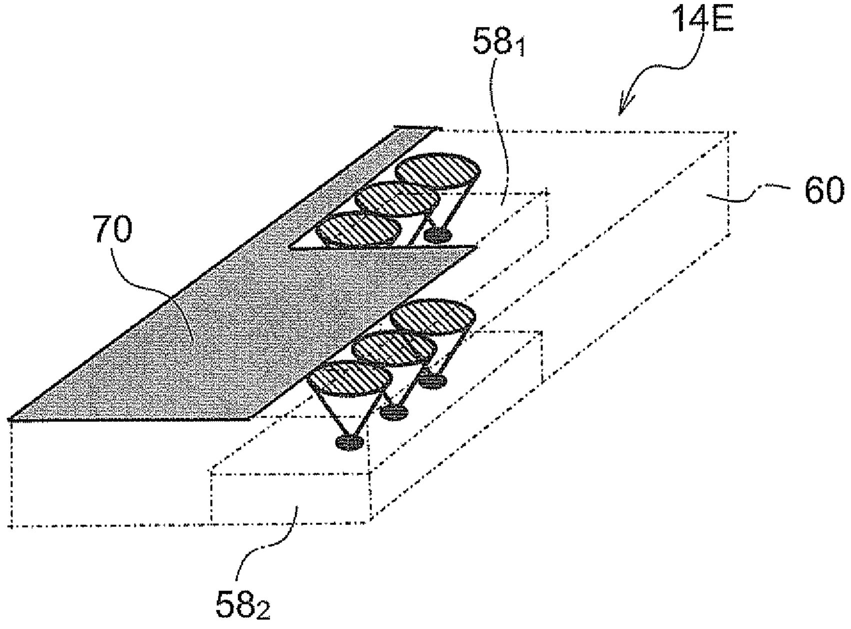
FIG. 15 is a schematic perspective view showing an example of the structure of an LED print head relating to a modified example of the fourth exemplary embodiment.

FIG. 15 is a schematic perspective view showing an example of the structure of an LED print head relating to a modified example of the fourth exemplary embodiment. Other than providing, at the LED print head, a light-blocking plate that blocks light other than the diffracted lights that are diffracted by the hologram elements 54, the structures are the same as those of the image fowling device and the LED print head relating to the second exemplary embodiment. Therefore, the same structural portions are denoted by the same reference numerals, and description thereof is omitted. Note that, in FIG. 15, illustration of the surface 12A of the photoreceptor drum 12 is omitted, and the LED substrate 58 and the hologram recording layer 60 are shown by imaginary lines.

As shown in FIG. 15, in the same way as in the third exemplary embodiment, an LPH 14E relating to the modified example has the LED chip $\mathbf{58}_1$ at which the plural LEDs 50 are packaged on an elongated LED substrate, and the LED chip $\mathbf{58}_2$ at which the plural LEDs 50 are packaged on an elongated LED substrate. The hologram recording layer 60 is formed on the LED chip $\mathbf{58}_1$ and the LED chip $\mathbf{58}_2$. The hologram element array 56, that is provided with the plural hologram elements 54 that respectively correspond to the plural LEDs 50, is formed at the hologram recording layer 60.

The light-blocking body 70, that is elongated and extends in the fast scanning direction, is provided at the obverse of the hologram recording layer 60. The LED chip $\mathbf{58}_1$ and the LED chip $\mathbf{58}_2$ are disposed so as to be offset at a uniform interval in the slow scanning direction. The diffracted lights corresponding to the LED chip $\mathbf{58}_1$, and the diffracted lights corresponding to the LED chip $\mathbf{58}_2$, exit at different angles from different positions. Accordingly, the elongated light-blocking body 70 is formed at a narrow width at the portion corresponding to the LED chip $\mathbf{58}_1$ and at a wide width at the portion corresponding to the LED chip $\mathbf{58}_2$. The light-blocking body 70 blocks the light other than the diffracted light diffracted by the hologram element array 56, and prevents stray light from being illuminated onto the photoreceptor drum 12.

Note that the fourth exemplary embodiment describes an example in which the light-blocking body 70 is provided on the obverse of the hologram recording layer 60, but the shape and the placement of the light-blocking body 70 are not limited to this. Various modified examples can be supposed, provided that the light-blocking body 70 exhibits the functions of blocking the light other than the diffracted light diffracted by the hologram element array 56, and preventing the other emitted light 72, that is diffused as stray light, from being illuminated onto the photoreceptor drum 12.

Figure 16:
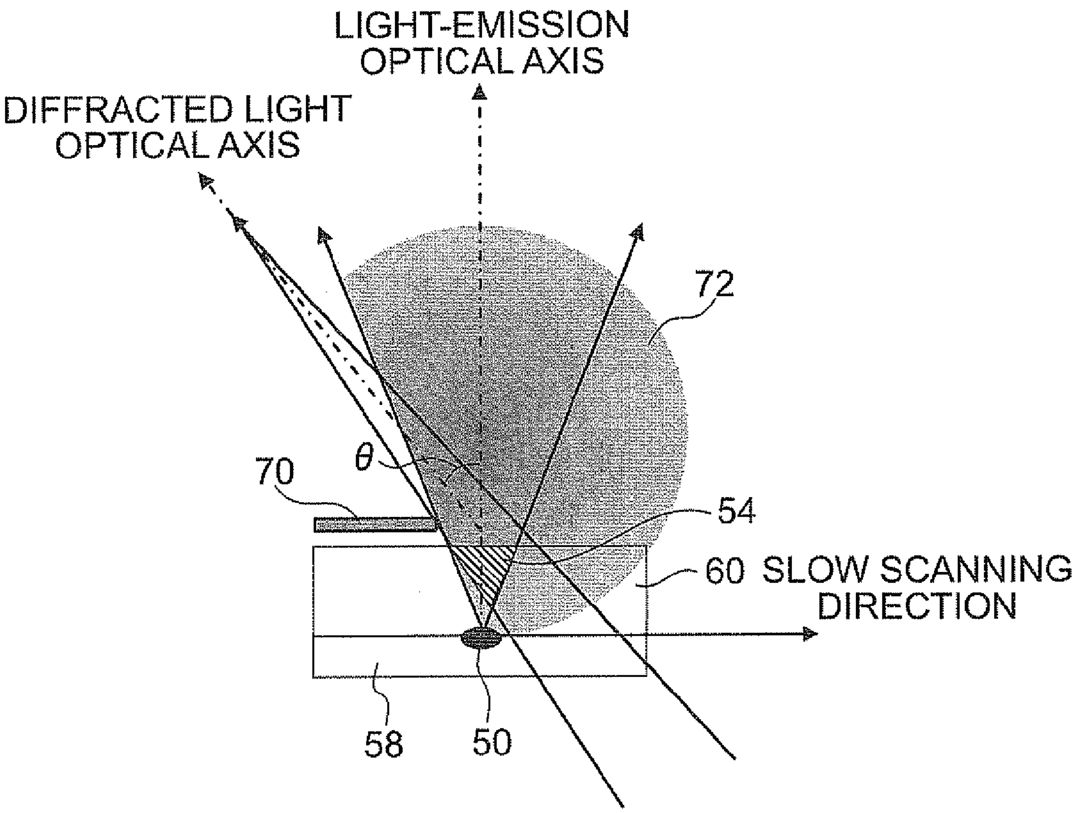
FIG. 16 is a cross-sectional view showing another arrangement example of a light-blocking body.

As shown in FIG. 16, the light-blocking body 70 may be disposed above the hologram recording layer 60, so as to be set apart from the obverse of the hologram recording layer 60. For example, the elongated light-blocking body 70 is held at a predetermined position above the hologram recording layer 60 by a holding member (not shown).

Figure 17:
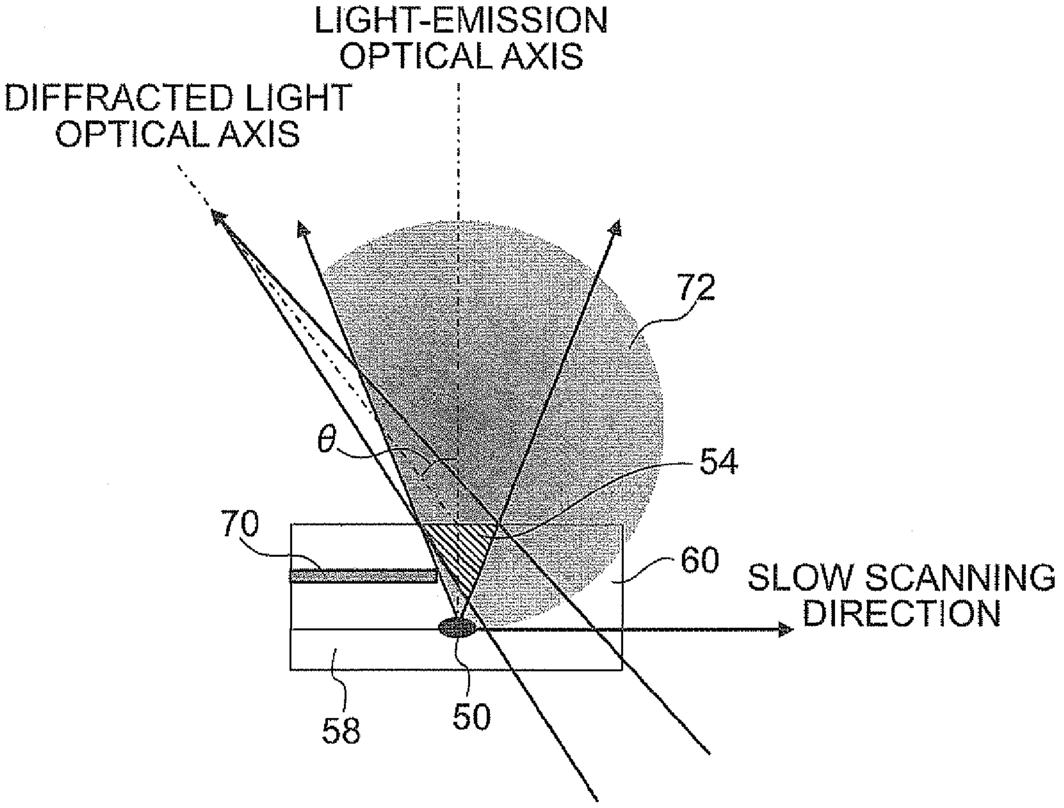
FIG. 17 is a cross-sectional view showing another arrangement example of the light-blocking body.
Figure 18:
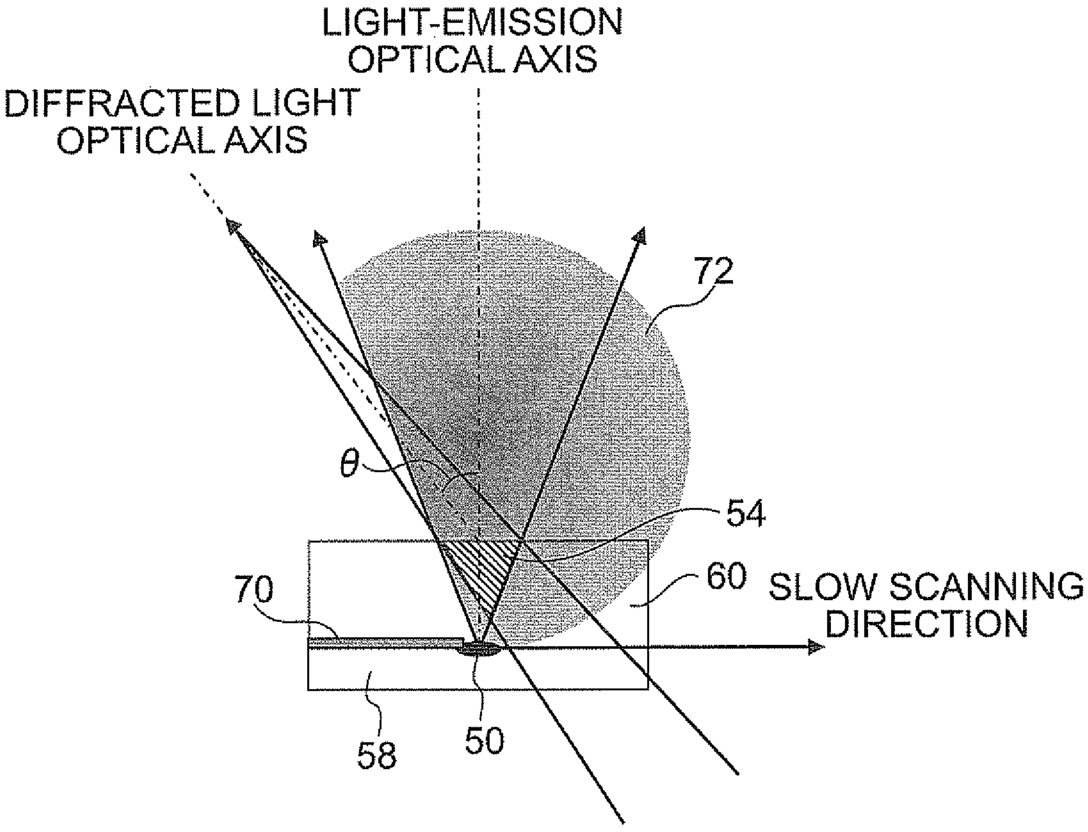
FIG. 18 is a cross-sectional view showing another arrangement example of the light-blocking body.

Further, as shown in FIG. 17, the light-blocking body 70 may be disposed within the hologram recording layer 60 by being embedded in the hologram recording layer 60. For example, at the time when the hologram recording layer 60A is formed (see FIG. 6B), the light-blocking body 70 is embedded therein in advance so as to avoid the optical paths of the signal light and the reference light. Or, as shown in FIG. 18, the light-blocking body 70 may be disposed at the surface of the LED substrate 58 (i.e., between the LED substrate 58 and the hologram recording layer 60). For example, the elongated light-blocking body 70 is formed in advance, before the hologram recording layer 60A is formed, at the surface of the LED substrate 58 so as to avoid the optical paths of the signal light and the reference light.

Figure 19:
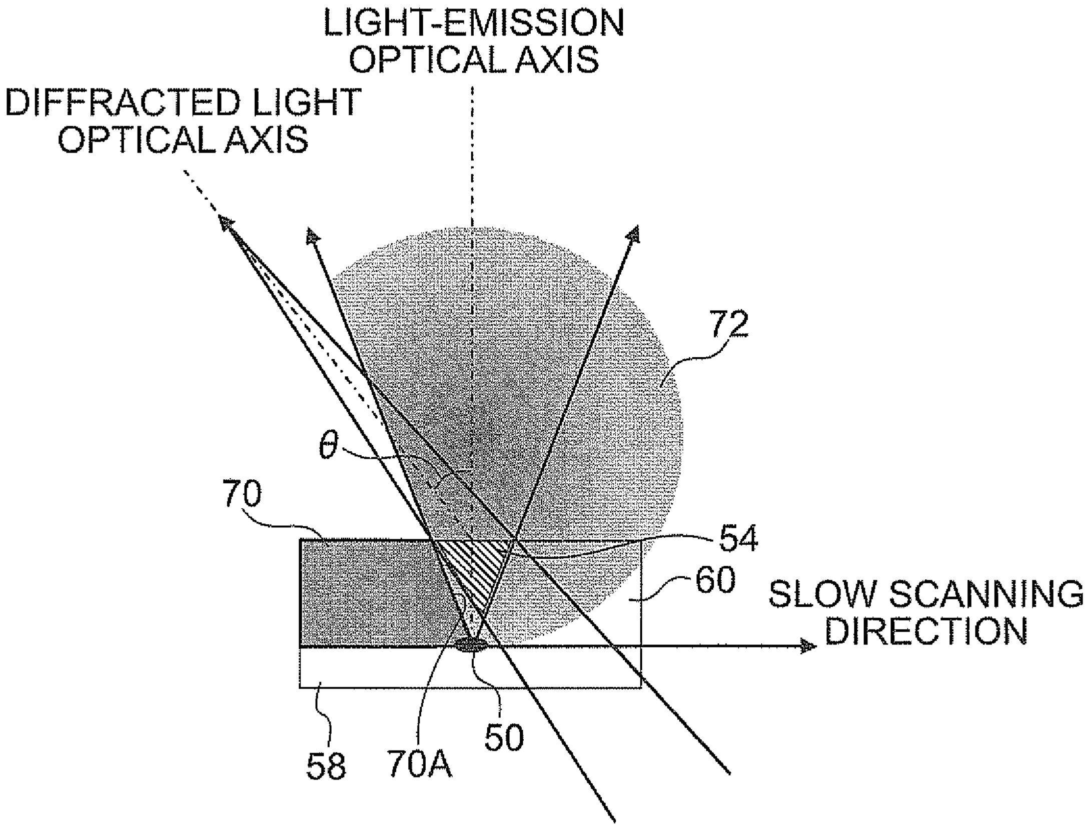
FIG. 19 is a cross-sectional view showing another arrangement example of the light-blocking body.
Figure 20:
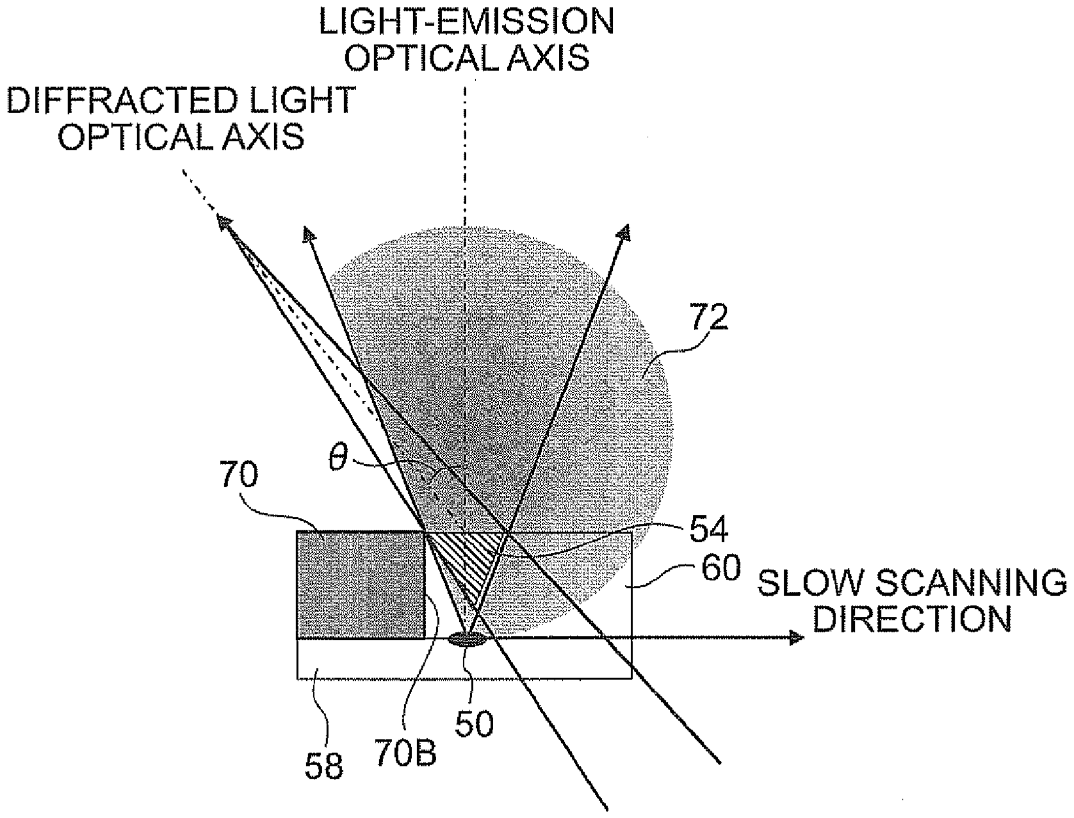
FIG. 20 is a cross-sectional view showing another arrangement example of the light-blocking body.

Moreover, as shown in FIG. 19 and FIG. 20, the light-blocking body 70 may be formed as a light-blocking layer that is continuous from the obverse to the reverse of the hologram recording layer 60. Namely, a portion of the hologram recording layer 60 may be replaced with a light-blocking body. In the example shown in FIG. 19, an inclined surface 70A at a slow scanning direction side of the light-blocking body 70 contacts the optical path of the reference light at the obverse and the reverse of the hologram recording layer 60. In the example shown in FIG. 20, a side surface 70B at a slow scanning direction side of the light-blocking body 70 is orthogonal to the surface of the LED substrate 58 and contacts the optical path of the reference light at the obverse of the hologram recording layer 60. For example, these light blocking bodies 70 are formed in advance on the LED substrate 58, before the hologram recording layer 60A is formed. Or, after the hologram recording layer 60A or the hologram recording layer 60 is formed, the light blocking body 70 is formed by coloring by a black dye, or the like.

Figure 21:
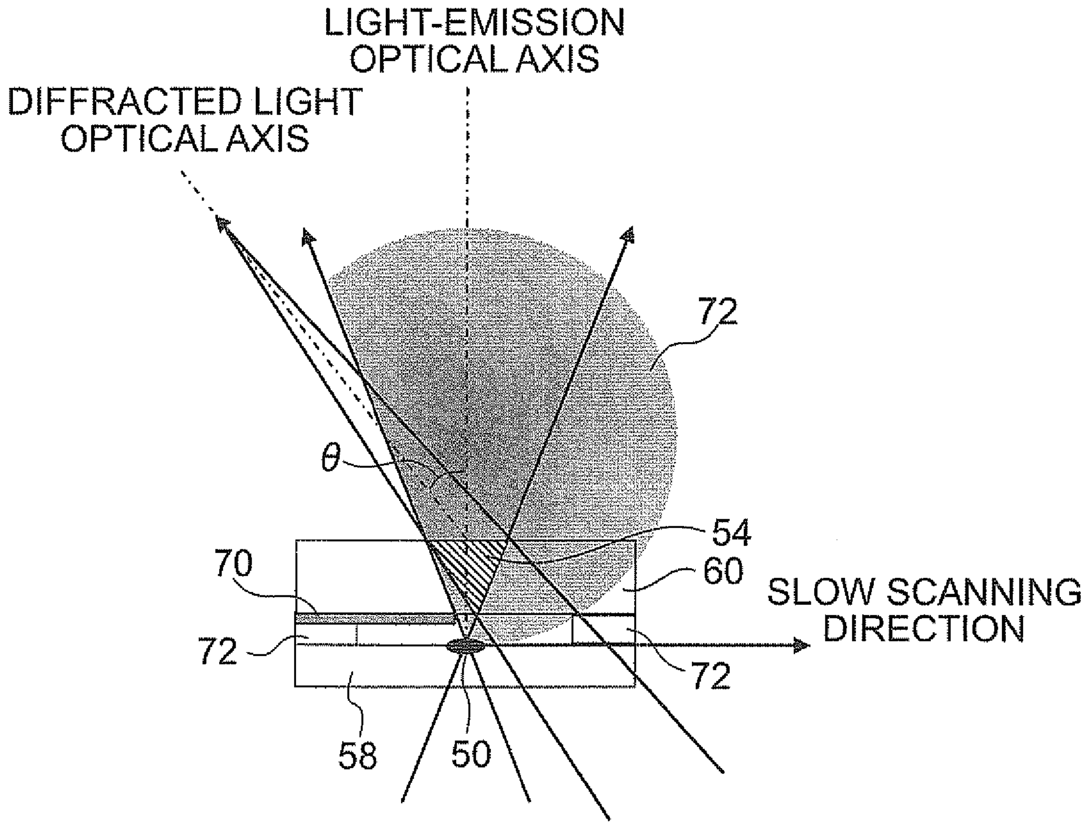
FIG. 21 is a cross-sectional view showing another arrangement example of the light-blocking body.
Figure 22:
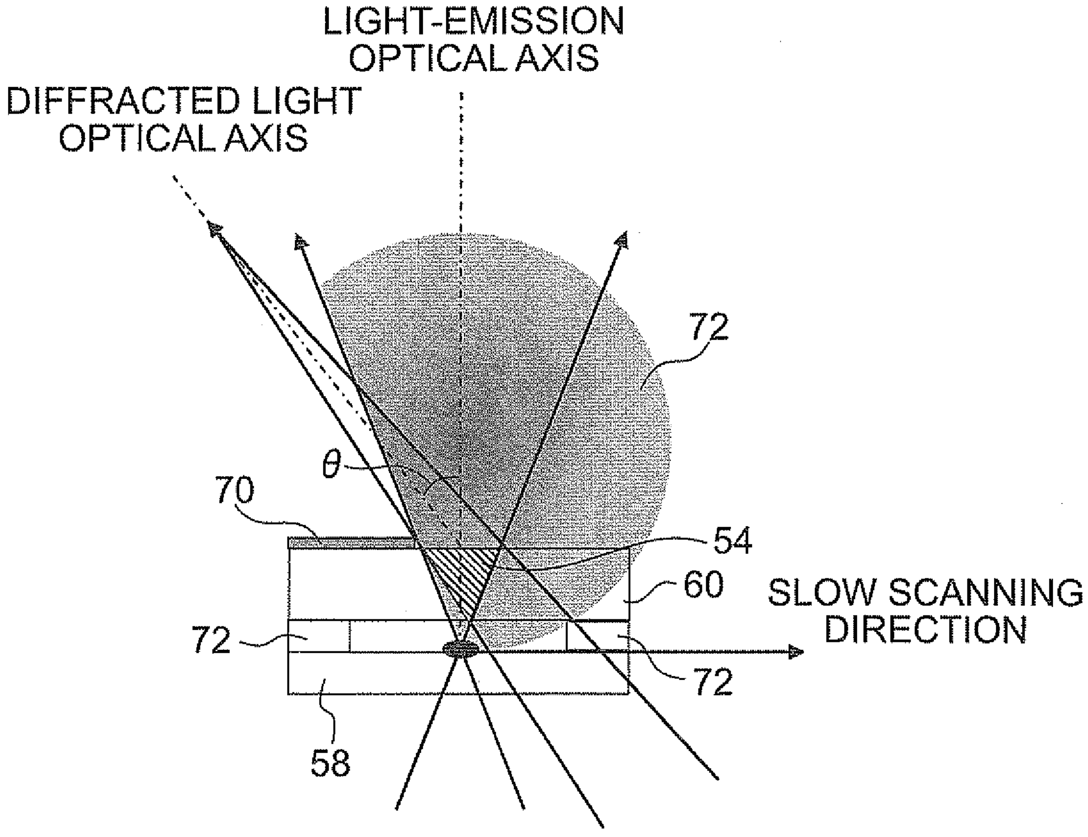
FIG. 22 is a cross-sectional view showing another arrangement example of the light-blocking body.

As shown in FIG. 21, supports 72 may be inserted between the LED substrate 58 and the hologram recording layer 60 such that the LED substrate 58 and the hologram recording layer 60 are separated, and the light-blocking body 70 may be disposed at the reverse of the hologram recording layer 60. Note that, as shown in FIG. 22, the LED substrate 58 and the hologram recording layer 60 may be separated, and the light-blocking body 70 may be disposed at the obverse of the hologram recording layer 60. For example, the elongated light-blocking body 70 is formed at the obverse or the reverse of the hologram recording layer 60 after the hologram recording layer 60 is formed separately from the LED substrate 58.

Figure 23:
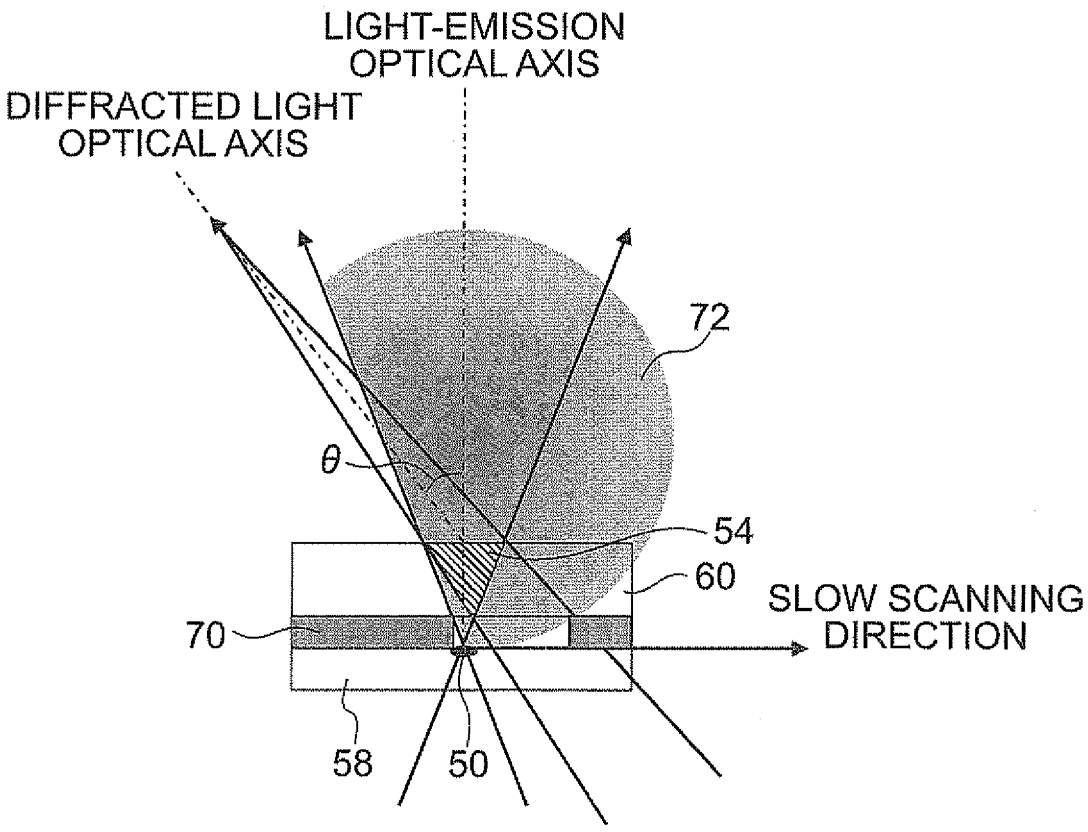
FIG. 23 is a cross-sectional view showing another arrangement example of the light-blocking body.

Further, as shown in FIG. 23, the light-blocking body 70 may be inserted between the LED substrate 58 and the hologram recording layer 60, such that the LED substrate 58 and the hologram recording layer 60 are separated.

Note that the above exemplary embodiments describe an LED print head that is equipped with plural LEDs, but other light-emitting elements, such as ELs or the like, may be used instead of the LEDs. By designing the hologram elements in accordance with the characteristics of the light-emitting elements and by preventing unnecessary exposure by incoherent light, minute spots having distinct outlines are formed in the same way as in cases in which LDs that emit coherent light are used as the light-emitting elements, even when LEDs or ELs that emit incoherent light are used as the light-emitting elements.

Further, the above exemplary embodiments describe examples of multiplex-recording plural hologram elements by spherical wave shift multiplexing. However, the plural hologram elements may be multiplex-recorded by another multiplexing method, provided that it is a multiplexing method by which the desired diffracted lights can be obtained. Further, plural types of multiplexing methods may be used in combination. Examples of other multiplexing methods include angle multiplex recording that records while changing the angle of incidence of the reference light, wavelength multiplex recording that records while changing the wavelength of the reference light, phase multiplex recording that records while changing the phase of the reference light, and the like. If multiplex recording is possible, separate diffracted lights are reconstructed without crosstalk from the plural holograms that are multiplex-recorded.

Further, the above exemplary embodiments describe a digital color printer of the type in which the image forming devices are in tandem, and an LED print head that serves an exposure device that exposes the photoreceptor drums of the respective image forming units. However, it suffices for there to be an image forming device that forms an image by image-wise exposing a photosensitive image recording medium by an exposure device, and the present invention is not limited to the example of the above exemplary embodiments. For example, the image forming device is not limited to a digital color printer of the electrophotographic method. The exposure device of the present invention may also be incorporated in an image forming device of the silver salt method, a writing device such as optical writing type electronic paper or the like, or the like. Further, the photosensitive image recording medium is not limited to a photoreceptor drum. The exposure device of the present invention can also be applied to the exposure of sheet-like photoreceptors or photographic photosensitive materials, photoresists, photopolymers, or the like.

What is claimed is:

1. An exposure device comprising:

a light-emitting element array at which a plurality of light-emitting elements, that emit light that passes through an optical path of diffused light, are arrayed one-dimensionally or two-dimensionally on a substrate; and a hologram element array at which a plurality of hologram elements are formed at positions, that respectively correspond to the plurality of light-emitting elements, of a hologram recording layer disposed on the substrate, so as to diffract and collect, at an outer side of illumination regions of all of the plurality of light-emitting elements, respective lights that are emitted from the plurality of light-emitting elements respectively, without an optical element between the light-emitting array and the hologram element array, wherein the hologram elements overlap one another when viewed along an optical axis of the light-emitting elements.

2. The exposure device of claim 1, wherein the plurality of light-emitting elements are arrayed at a predetermined interval in a longitudinal direction of the substrate, and the plurality of hologram elements are formed such that diameters of the hologram elements in the longitudinal direction of the substrate overlap one another more greatly than the predetermined interval.

3. The exposure device of claim 1, wherein the plurality of hologram elements are formed such that a plurality of collected light points, that are formed on an imaging surface by the respective lights being collected, are lined-up in a predetermined direction.

4. The exposure device of claim 1, wherein each of the plurality of light-emitting elements is an incoherent light source.

5. The exposure device of claim 1, further comprising a light-blocking body that blocks light that passes at an outer side of the plurality of hologram elements, among the respective lights emitted from the plurality of light-emitting elements respectively.

6. An image forming device comprising:

the exposure device of claim 1;

an image recording medium that is photosensitive and on which an image is recorded by image-wise exposure by the exposure device;

moving unit for moving the image recording medium relative to the exposure device; and control unit for, on the basis of image data, controlling the moving unit such that the image recording medium is slow-scanned in a direction intersecting the longitudinal direction of the substrate, and controlling lighting of the plurality of light-emitting elements respectively.

* * * * *